(12) United States Patent
Liu et al.

(10) Patent No.: US 11,748,601 B2
(45) Date of Patent: *Sep. 5, 2023

(54) INTEGRATED CIRCUIT CHIP DEVICE

(71) Applicant: CAMBRICON TECHNOLOGIES CORPORATION LIMITED, Beijing (CN)

(72) Inventors: Shaoli Liu, Beijing (CN); Xinkai Song, Beijing (CN); Bingrui Wang, Beijing (CN); Yao Zhang, Beijing (CN); Shuai Hu, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 313 days.

This patent is subject to a terminal disclaimer.

(21) Appl. No.: 17/134,444

(22) Filed: Dec. 27, 2020

(65) Prior Publication Data
US 2021/0150324 A1   May 20, 2021

Related U.S. Application Data

(63) Continuation of application No. 16/903,304, filed on Jun. 16, 2020, now Pat. No. 11,544,546, which is a (Continued)

(30) Foreign Application Priority Data

| Dec. 27, 2017 | (CN) | 201711455388.4 |
| Dec. 27, 2017 | (CN) | 201711455397.3 |
| Dec. 28, 2017 | (CN) | 201711466943.3 |
| Dec. 28, 2017 | (CN) | 201711468629.9 |
| Dec. 28, 2017 | (CN) | 201711469408.3 |

(Continued)

(51) Int. Cl.
*G06N 3/063* (2023.01)
*G06N 3/04* (2023.01)

(52) U.S. Cl.
CPC .............. *G06N 3/063* (2013.01); *G06N 3/04* (2013.01)

(58) Field of Classification Search
CPC ....................................................... G06N 3/063
See application file for complete search history.

(56) References Cited

U.S. PATENT DOCUMENTS 9,779,786 B1   10/2017   Wu et al.
2018/0211620 A1   7/2018   Kurokawa et al.
(Continued)

FOREIGN PATENT DOCUMENTS

CN   104572011 A   4/2015
CN   105426344 A   3/2016
(Continued)

OTHER PUBLICATIONS

First Office action issued in related Chinese Application No. 201711455388.4, dated Nov. 22, 2019, 10 pages.
(Continued)

*Primary Examiner* — Simon P Kanaan
(74) *Attorney, Agent, or Firm* — Bayes PLLC

(57) ABSTRACT

An integrated circuit chip device and related products are provided. The integrated circuit chip device is used for performing a multiplication operation, a convolution operation or a training operation of a neural network. The device has the advantages of small calculation amount and low power consumption.

20 Claims, 23 Drawing Sheets

Related U.S. Application Data continuation of application No. PCT/CN2018/123929, filed on Dec. 26, 2018.

(30) Foreign Application Priority Data

Dec. 28, 2017 (CN) .......................... 201711469614.4
Dec. 28, 2017 (CN) .......................... 201711469615.9

(56) References Cited

U.S. PATENT DOCUMENTS

2019/0042870 A1  2/2019  Chen et al.
2020/0090029 A1  3/2020  Suzuki

FOREIGN PATENT DOCUMENTS

| CN | 106126481 A | 11/2016 |
| CN | 107229967 A | 10/2017 |
| CN | 107330515 A | 11/2017 |
| CN | 109961136 A | 7/2019 |
| CN | 109961138 A | 7/2019 |

OTHER PUBLICATIONS

First Office action issued in related Chinese Application No. 201711455397.3, dated Nov. 14, 2019, 8 pages.
Second Office action issued in related Chinese Application No. 201711455397.3, dated Mar. 3, 2020, 7 pages.
First Office action issued in related Chinese Application No. 201711469615.9, dated Nov. 20, 2019, 10 pages.
First Office action issued in related Chinese Application No. 201711468629.9, dated Dec. 3, 2019, 8 pages.
Extended European Search Report in related European Application No. 20203232.2, dated Feb. 4, 2021 (7 pages).
Office Action in related Chinese Application No. 201711466943.3, dated Nov. 29, 2019 (10 pages).
Farabet et al., "Hardware Accelerated Convolutional Neural Networks for Synthetic Vision Systems", IEEE International Symposium on Circuits and Systems, May 30, 2010 (4 pages).

INTEGRATED CIRCUIT CHIP DEVICE

CROSS-REFERENCE TO RELATED APPLICATIONS

This application is a continuation of U.S. patent application Ser. No. 16/903,304, filed Jun. 16, 2020, which is a continuation of International Application No. PCT/CN2018/123929, filed Dec. 26, 2018, which claims the benefits of priority to Chinese Application Nos. 201711455388.4, filed Dec. 27, 2017; 201711455397.3, filed Dec. 27, 2017; 201711466943.3, filed Dec. 28, 2017; 201711468629.9, filed Dec. 28, 2017; 201711469408.3, filed Dec. 28, 2017; 201711469614.4, filed Dec. 28, 2017; and 201711469615.9, filed Dec. 28, 2017. The entire contents of each of the above-identified applications are expressly incorporated herein by reference.

TECHNICAL FIELD

The present disclosure relates to the field of neural network, and particularly relates to an integrated circuit chip device.

BACKGROUND

ANN (Artificial Neural Network) is a research focus emerged in 1980s in the field of artificial intelligence. ANN abstracts the human brain neuron network in terms of information processing to establish a simple model, and then builds different networks with different connection methods. ANN is often referred to as neural network in engineering and academia. Neural networks are a type of computational model. They are formed by a large number of interconnecting nodes (or may be referred to as neurons). Existing neural networks rely on CPU (Central Processing Unit) or GPU (Graphics Processing Unit) to realize neural network operations which often require a large amount of computations and cause high power consumption.

SUMMARY

The present disclosure provides an integrated circuit chip device and a product thereof. Compared with the existing integrated circuit chip device, the disclosed integrated circuit chip device and the product thereof can reduce computations and power consumption.

A first aspect provides an integrated circuit chip device configured to perform neural network training. The neural network has n layers, where n is an integer greater than or equal to 2. The integrated circuit chip device includes a main processing circuit and a plurality of basic processing circuits. The main processing circuit includes a data type conversion circuit configured to convert data between a floating point data type and a fixed point data type.

The integrated circuit chip device is configured to receive a training instruction, determine input data and weight group data of a first layer according to the training instruction, and perform forward computations of the n layers of the neural network on the input data and the weight group data of the first layer to obtain an $i^{th}$ output result of the forward computations, i being an integer greater than or equal to 1 and smaller than or equal to n.

The main processing circuit is configured to obtain an $i^{th}$ output result gradient according to the $i^{th}$ output result, obtain an $i^{th}$ backward computation of backward computations of an $i^{th}$ layer according to the training instruction, obtain an $i^{th}$ backward computation complexity according to the $i^{th}$ output result gradient, input data of the $i^{th}$ layer, weight group data of the $i^{th}$ layer, and the $i^{th}$ backward computation, and determine an $i^{th}$ back data type corresponding to the $i^{th}$ output result gradient, the input data of the $i^{th}$ layer, and the weight group data of the $i^{th}$ layer according to the $i^{th}$ backward computation complexity.

The main processing circuit is configured to determine the $i^{th}$ output result gradient, the input data of the $i^{th}$ layer, and the weight group data of the $i^{th}$ layer as a broadcasting data block and a distribution data block according to a type of the $i^{th}$ backward computation, partition the distribution data block of the $i^{th}$ back data type to obtain a plurality of basic data blocks, distribute the plurality of basic data blocks to at least one of the plurality of basic processing circuits, and broadcast the broadcasting data block of the $i^{th}$ back data type to the plurality of basic processing circuits.

The plurality of basic processing circuits are configured to perform computations on the broadcasting data block and the basic data blocks in the $i^{th}$ back data type to obtain computation results, and transfer the computation results to the main processing circuit.

The main processing circuit is configured to process the computation results to obtain a weight group gradient of the $i^{th}$ layer and an input data gradient of the $i^{th}$ layer, and update the weight group data of the $i^{th}$ layer according to the weight group gradient of the $i^{th}$ layer. The $i^{th}$ back data type includes a fixed point type or a floating point type.

The integrated circuit device is configured to perform backward computations of an $(i-1)^{th}$ layer by using the input data gradient of the $i^{th}$ layer as an $(i-1)^{th}$ output result gradient of the $(i-1)^{th}$ layer to obtain a weight group gradient of the $(i-1)^{th}$ layer, and update weight group data of a corresponding layer according to the weight group gradient of the $(i-1)^{th}$ layer, where the weight group data includes at least two weights.

Alternatively or additionally, the main processing circuit is configured to compare the $i^{th}$ backward computation complexity with a preset threshold. If the $i^{th}$ backward computation complexity is greater than the preset threshold, the main processing circuit determines the $i^{th}$ back data type as the fixed point type. If the $i^{th}$ backward computation complexity is less than or equal to the preset threshold, the main processing circuit determines the $i^{th}$ back data type as the floating point type.

Alternatively or additionally, the main processing circuit is configured to determine whether the $i^{th}$ output result gradient, the input data of the $i^{th}$ layer, and the weight group data of the $i^{th}$ layer belong to an $(i+1)^{th}$ back data type. If the $(i+1)^{th}$ back data type differs from the $i^{th}$ back data type, the main processing circuit converts the $i^{th}$ output result gradient, the input data of the $i^{th}$ layer, and the weight group data of $i^{th}$ layer belonging to the $(i+1)^{th}$ back data type to the $i^{th}$ output result gradient, the input data of the $i^{th}$ layer, and the weight group data of $i^{th}$ layer belonging to the $i^{th}$ back data type through the data type conversion circuit.

Alternatively or additionally, if the backward computations of the $i^{th}$ layer are convolution computations, the main processing circuit determines convolution input data as the input data of the $i^{th}$ layer, and a convolution kernel as the $i^{th}$ output result gradient.

The $i^{th}$ backward computation complexity is computed as: $i^{th}$ backward computation complexity = $\alpha * C1 * kW * kH * M * N * W * C2 * H$.

α is a convolution coefficient greater than 1. C1, kW, kH, M are values of four dimensions of the convolution kernel. N, W, C2, H are values of four dimensions of the convolution input data.

If the complexity is greater than the preset threshold, the main processing circuit determines the $i^{th}$ back data type as the floating point type, and determines whether the convolution input data and the convolution kernel are floating point data. If the convolution input data and the convolution kernel are not floating point data, the main processing circuit converts the convolution input data and the convolution kernel into floating point data, and perform convolution computations on the convolution input data and the convolution kernel of the floating point type.

Alternatively or additionally, if the $i^{th}$ backward computation is a matrix-multiply-matrix computation, the main processing circuit is further configured to determine the input data as the input data of the $i^{th}$ layer, and determine the weight as the $i^{th}$ output result gradient.

The complexity is computed as: complexity=$\beta*F*G*E*F1$. $\beta$ is a matrix coefficient greater than or equal to 1. F and G are row and column values of the input data of the $i^{th}$ layer. E and F1 are row and column values of the weight.

If the complexity is greater than the preset threshold, the main processing circuit determines the $i^{th}$ back data type as the floating point type, and determines whether the input data and the weight of the $i^{th}$ layer are floating point data. If the input data and the weight of the $i^{th}$ layer are not floating point data, the main processing circuit converts the input data and the weight of the $i^{th}$ layer into floating point data, and performs matrix-multiply-matrix computations on the input data and the weight of the $i^{th}$ layer of the floating point type.

Alternatively or additionally, if the $i^{th}$ backward computation is a matrix-multiply-vector computation, the integrated circuit chip device is further configured to determine the input data as the input data of the $i^{th}$ layer, and determine the weight as the $i^{th}$ output result gradient.

The complexity=$\beta*F*G*F1$. $\beta$ is a matrix coefficient greater than or equal to 1, F and G are row and column values of the input data of the $i^{th}$ layer. F1 is a column value of the $i^{th}$ output result gradient.

If the complexity is greater than the preset threshold, the integrated circuit chip device determines the $i^{th}$ back data type as the floating point type, and determines whether the input data and the weight of the $i^{th}$ layer are floating point data. If the input data and the weight of the $i^{th}$ layer are not floating point data, the integrated circuit chip device converts the input data and the weight of the $i^{th}$ layer into floating point data, and performs matrix-multiply-vector computations on the input data and the weight of the $i^{th}$ layer of the floating point type.

Alternatively or additionally, if the type of the $i^{th}$ backward computation is a multiplication computation, the main processing circuit is configured to classify both the input data of the $i^{th}$ layer and the weight group data of the $i^{th}$ layer into distribution data blocks, and classify the $i^{th}$ output result gradient into a broadcasting data block. If the type of the $i^{th}$ backward computation is a convolution computation, the main processing circuit is configured to classify both the input data of the $i^{th}$ layer and the weight group data of the $i^{th}$ layer into broadcasting data blocks, and classify the $i^{th}$ output result gradient into a distribution data block.

Alternatively or additionally, the backward computations of the $i^{th}$ layer further includes one or more of a bias computation, a fully connected computation, a GEMM computation, a GEMV computation, and an activation computation.

Alternatively or additionally, the main processing circuit includes a main register or a main on-chip caching circuit.

The basic processing circuits include basic registers or basic on-chip caching circuits.

Alternatively or additionally, the main processing circuit includes one or more of a vector computing unit circuit, an ALU (arithmetic and logic unit) circuit, an accumulator circuit, a matrix transposition circuit, a direct memory access circuit, or a data rearrangement circuit.

Alternatively or additionally, the $i^{th}$ output result gradient is one or more of a vector, a matrix, a three-dimensional data block, a four-dimensional data block, and an n-dimensional data block.

The $i^{th}$ input data is one or more of a vector, a matrix, a three-dimensional data block, a four-dimensional data block, and an n-dimensional data block.

The weight data of $i^{th}$ layer is one or more of a vector, a matrix, a three-dimensional data block, a four-dimensional data block, and an n-dimensional data block.

A second aspect provides a neural network computing device. The neural network computing device includes one or more of the integrated circuit chip devices provided in the first aspect.

A third aspect provides a combined processing device. The combined processing device includes: the neural network computing device provided in the second aspect, a general interconnection interface, and a general processing device.

The neural network computing device is connected to the general processing device through the general interconnection interface.

A fourth aspect provides a chip that integrates the device of the first aspect, the device of the second aspect, or the device of the third aspect.

A fifth aspect provides an electronic device which includes the chip of the fourth aspect.

It can be seen that, according to examples of the present disclosure, a data type conversion circuit is provided to convert a type of a data block before an operation is performed, which may save resources for transmission and computation, and may thus have technical effects of low power consumption and a small amount of computation.

BRIEF DESCRIPTION OF THE DRAWINGS

In order to illustrate the technical solutions in the examples of the present disclosure more clearly, the drawings to be used in the description of the examples are briefly explained below. Obviously, the drawings in the description below are some examples of the present disclosure. Other drawings can be obtained according to the disclosed drawings without any creative effort by those skilled in the art.

DETAILED DESCRIPTION

Technical solutions in examples of the present disclosure will be described clearly and completely hereinafter with reference to the accompanied drawings in the examples of the present disclosure. Obviously, the examples to be described are merely some rather than all examples of the present disclosure. All other examples obtained by those of ordinary skill in the art based on the examples of the present disclosure without creative efforts shall fall within the protection scope of the present disclosure.

Terms such as "first", "second", "third", and "fourth" in the specification, the claims, and the drawings are used for distinguishing different objects rather than describing a specific order. In addition, terms such as "include", "have", and any variant thereof are used for indicating non-exclusive inclusion. For instance, a process, a method, a system, a product, or an equipment including a series of steps or units is not limited to the listed steps or units, but may include steps or units that are not listed, or may include other steps or units inherent to the process, the method, the product, or the equipment.

Reference to "example" means that a particular feature, a structure, or a characteristic described in conjunction with the example may be included in at least one example of the present disclosure. The use of the term in various places in the specification does not necessarily refer to the same example, nor is it referring independent or alternative examples that are mutually exclusive with other examples. It is explicitly and implicitly understood by those skilled in the art that the examples described in the specification may be combined with other examples.

Figure 19:
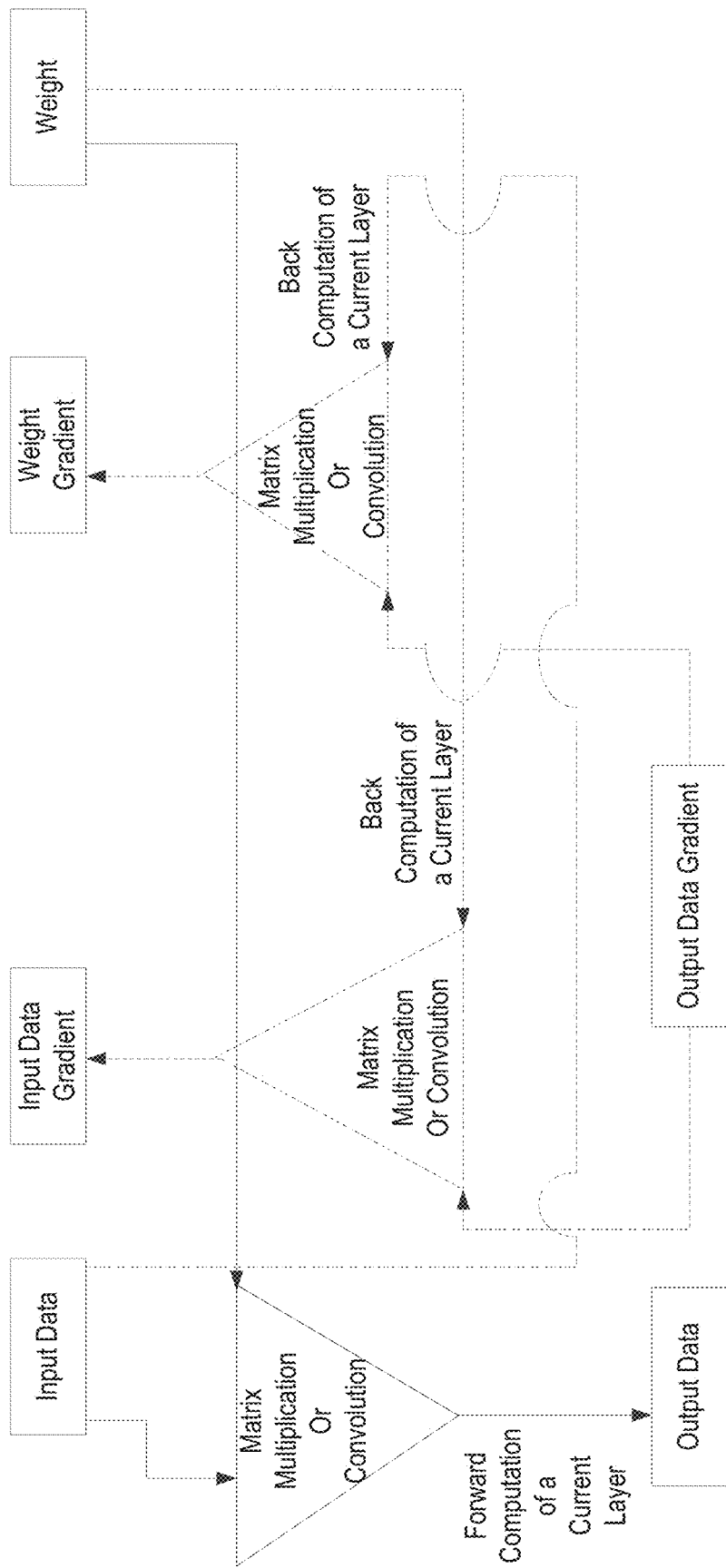
FIG. 19 is a schematic diagram of a neural network training method.

As shown in FIG. 19, steps of neural network training include:

performing a forward operation for each layer of a (multi-layer) neural network sequentially;

performing backward operations according to a reversed order of the layers to obtain weight gradients; and updating weights of the forward operations using the weight gradients obtained from operations.

The steps above are a sequential iteration of neural network training, which are repeated for several times (that is, a plurality of iteration computations) in an entire training process.

Figure 4:
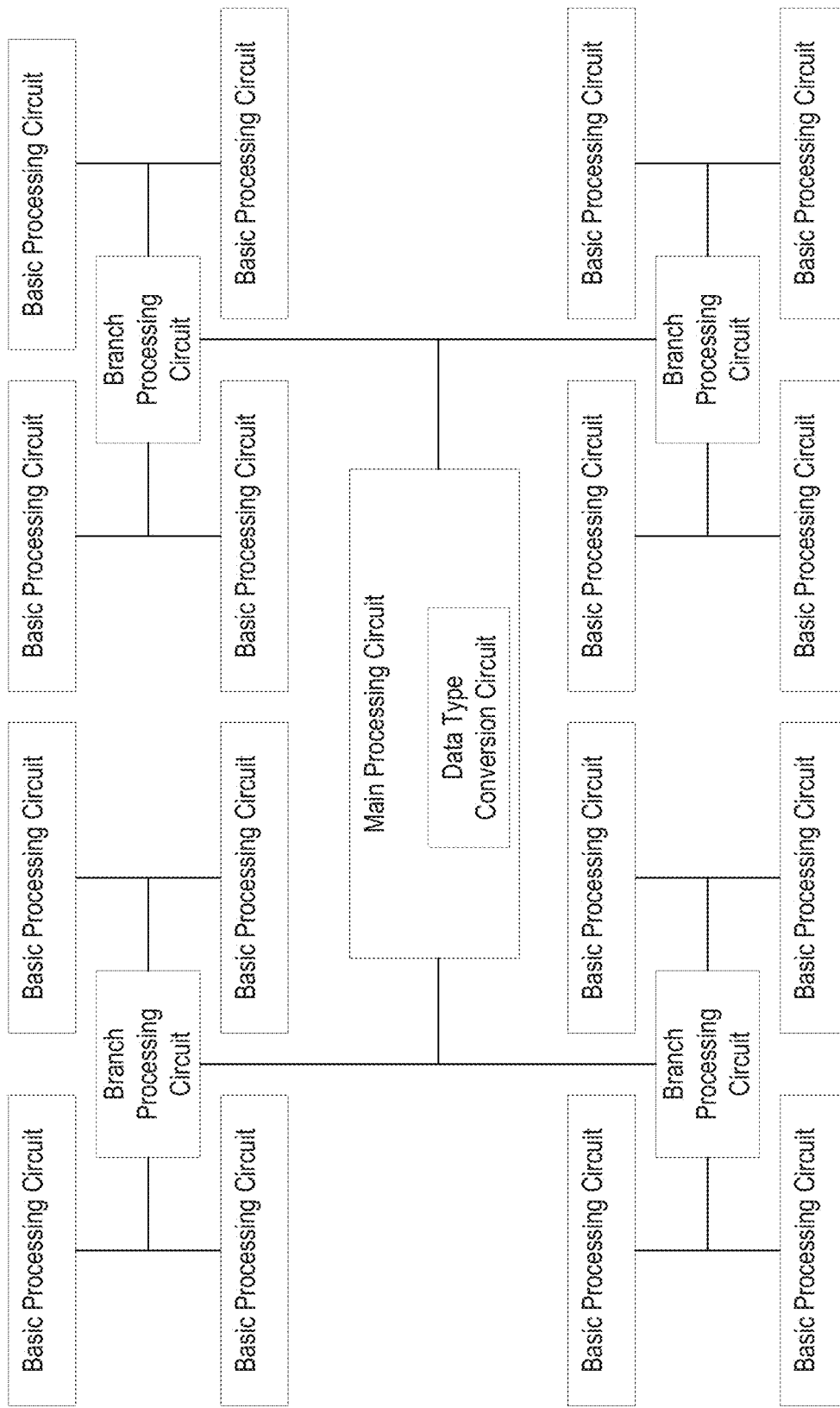
FIG. 4 is a structural diagram of an integrated circuit chip device.

FIG. 4 provides an integrated circuit chip device configured to perform neural network training. The neural network has n layers, where n is an integer greater than or equal to 2. The integrated circuit chip device includes a main processing circuit and a plurality of basic processing circuits. The main processing circuit includes a data type conversion circuit configured to convert data between a floating point data type and a fixed point data type.

The integrated circuit chip device is configured to receive a training instruction, determine input data and weight group data of a first layer according to the training instruction, and perform forward computations of the n layers of the neural network on the input data and the weight group data of the first layer to obtain an $i^{th}$ output result of the forward computations.

The main processing circuit is further configured to obtain an $i^{th}$ output result gradient according to the $i^{th}$ output result, obtain an $i^{th}$ backward computation of backward computations of an $i^{th}$ layer according to the training instruction, obtain an $i^{th}$ backward computation complexity according to the $i^{th}$ output result gradient, input data of the $i^{th}$ layer, weight group data of the $i^{th}$ layer, and the $i^{th}$ backward computation, and determine an $i^{th}$ back data type corresponding to the $i^{th}$ output result gradient, the input data of the $i^{th}$ layer, and the weight group data of the $i^{th}$ layer according to the $i^{th}$ backward computation complexity.

The main processing circuit is configured to determine the $i^{th}$ output result gradient, the input data of the $i^{th}$ layer, and the weight group data of the $i^{th}$ layer as a broadcasting data block and a distribution data block according to a type of the $i^{th}$ backward computation, partition the distribution data block of the $i^{th}$ back data type to obtain a plurality of basic data blocks, distribute the plurality of basic data blocks to at least one of the plurality of basic processing circuits, and broadcast the broadcasting data block of the $i^{th}$ back data type to the plurality of basic processing circuits.

The plurality of basic processing circuits are configured to perform computations on the broadcasting data block and the basic data blocks in the $i^{th}$ back data type to obtain computation results, and transfer the computation results to the main processing circuit.

The main processing circuit is configured to process the computation results to obtain a weight group gradient of the $i^{th}$ layer and an input data gradient of the $i^{th}$ layer, and update the weight group data of the $i^{th}$ layer according to the weight group gradient of the $i^{th}$ layer. The $i^{th}$ back data type includes a fixed point type or a floating point type.

The integrated circuit device is configured to perform backward computations of an $(i-1)^{th}$ layer by using the input data gradient of the $i^{th}$ layer as an $(i-1)^{th}$ output result gradient of the $(i-1)^{th}$ layer to obtain a weight group gradient of the $(i-1)^{th}$ layer, and update weight group data of a corresponding layer according to the weight group gradient of the (i−1)$^{th}$ layer, where the weight group data includes at least two weights.

Figure 6:
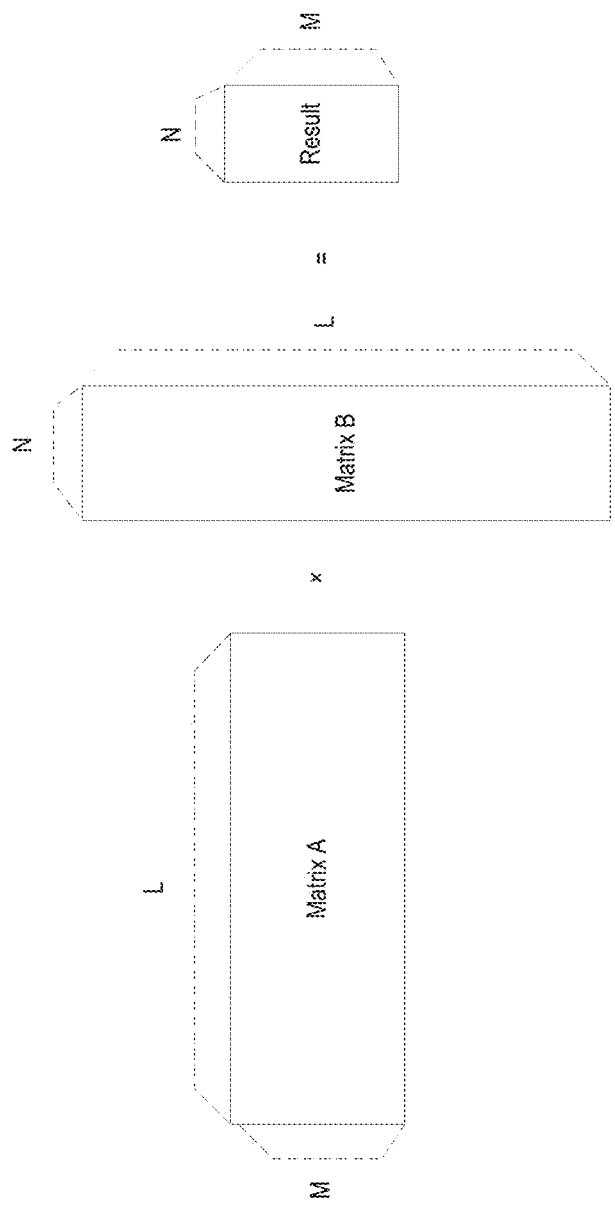
FIG. 6 is a schematic diagram showing a matrix-multiply-vector computation.

FIG. 6 shows a forward computation of a neural network provided by an example of the present disclosure. Each layer may use input data and a weight of the present layer to obtain corresponding output data by performing computations according to a computation rule designated by a type of the layer.

The forward computation (also referred to as inference) of a neural network is a process of obtaining output data by processing input data of each layer and performing computations layer by layer, which has the following characteristics:

input of a layer:
input of a layer may be input data of a neural network;
input of a layer may be output data of another layer;
input of a layer may be output of the present layer at a last time (corresponding to a case of a recurrent neural network);
a layer may obtain input from a plurality of the sources above simultaneously.
output of a layer:
output of a layer may serve as an output result of a neural network;
output of a layer may be input of another layer;
output of a layer may be input of the present layer at a next time (corresponding to a case of a recurrent neural network);
a layer may output a result to a plurality of the output directions above.

Specifically, a type of a computation of a neural network layer may include but is not limited to:

a convolution layer (for performing a convolution computation);
a fully connected layer (for performing a fully connected computation);
a normalization layer, including a LRN (Local Response Normalization) layer, a BN (Batch Normalization) layer, and other types of layer;
a pooling layer; and
an activation layer, including but not limited to a Sigmoid layer, a ReLU layer, a PReLu layer, a LeakyReLu layer, and a Tanh layer.

A backward computation of a neural network layer includes computations of two parts. A first part is computing a gradient (a weight used in a weight updating step to update a weight of a current layer) of a weight by using an output data gradient that may be sparse and input data that may be sparse. A second part is computing an input data gradient (used as output data of a next layer in the backward computation so that the backward computation can be performed) by using an output data gradient that may be sparse and a weight that may be sparse.

The backward computation may follow an order that is opposite to an order of a forward computation to transfer a gradient reversely from a last layer.

In an alternative example, an output data gradient obtained from the backward computation of a layer may be from:
a gradient returned by a last lost function (or cost function) of the neural network;
an input data gradient of another layer; and
an input data gradient of the present layer at a last time (corresponding to a case of a recurrent neural network).

A layer may obtain an output data gradient from a plurality of above-mentioned sources simultaneously.

After the backward computation of the neural network is completed, a gradient of a weight of each layer is obtained. In this step, a first input cache and a second input cache may be configured to store a weight and a gradient of the weight of a layer, then use the gradient of the weight in a computing unit to update the weight.

The above-mentioned computation is a computation of a neural network layer. For a multi-layer neural network, an implementation of the computation may be that, in a forward computation, after the computation of a previous layer of the artificial neural network is completed, a computation instruction of a next layer is performed by using output data obtained by a computing unit as input data of the next layer to perform a computation (or perform some operations on the output data then use the output data as input data of the next layer). At the same time, a weight is replaced with a weight of the next layer. In a backward computation, after the backward computation of a previous layer of the artificial neural network is completed, a computation instruction of a next layer is performed by using an input data gradient obtained by a computing unit as an output data gradient of the next layer to perform a computation (or perform some operations on the input data gradient then use the input data gradient as output data gradient of the next layer). At the same time, a weight is replaced with a weight of the next layer (as shown in the accompanied drawing, the dashed line arrow indicates the backward computation, the continuous line arrow indicates the forward computation. The marks below each figure indicate the meaning of the figure).

The present disclosure provides a method of fixed point data conversion.

The method of fixed point data conversion refers to converting a data representation of a data block in a network into a data representation of which the decimal point has a fixed position (a manner of placing 0/1 bit of data that is mapped to circuit device).

As an alternative example, a plurality of groups of data constitute a plurality of data blocks. The plurality of data blocks may be converted into a fixed point representation as whole according to the same fixed point representation method.

Figure 3:
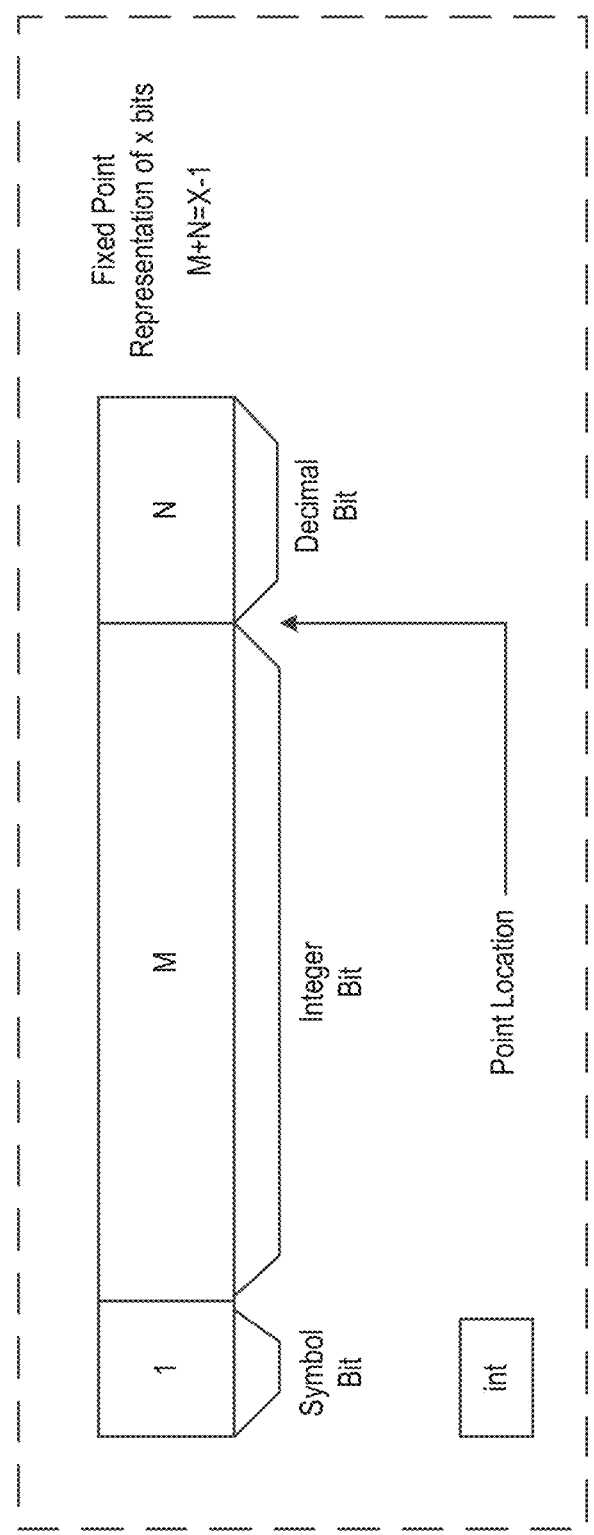
FIG. 3 is a schematic diagram of a fixed point data type.

FIG. 3 shows a method of storing data which has a fixed point data structure with fewer digits according to an example of the present disclosure. 1 bit is for representing a symbol, M bits for representing an integer part, and N bits for representing a decimal part. Compared with a 32-bit floating point number representation, the present disclosure uses a fixed point data representation with fewer digits. The data representation above has fewer bits. Additionally, for data of the same layer and the same type in a neural network, such as all weight data of a first convolution layer, a flag bit (point location) is set in the data representation to mark the position of the decimal point. In this way, the precision of the data representation and the representable data range may be adjusted according to the distribution of data.

A floating point number may be represented in 32 bits. The present disclosure uses the fixed point data representation. In this way, bits of a numerical value may be reduced, and data transfer as well as computations may be reduced.

Figure 8:
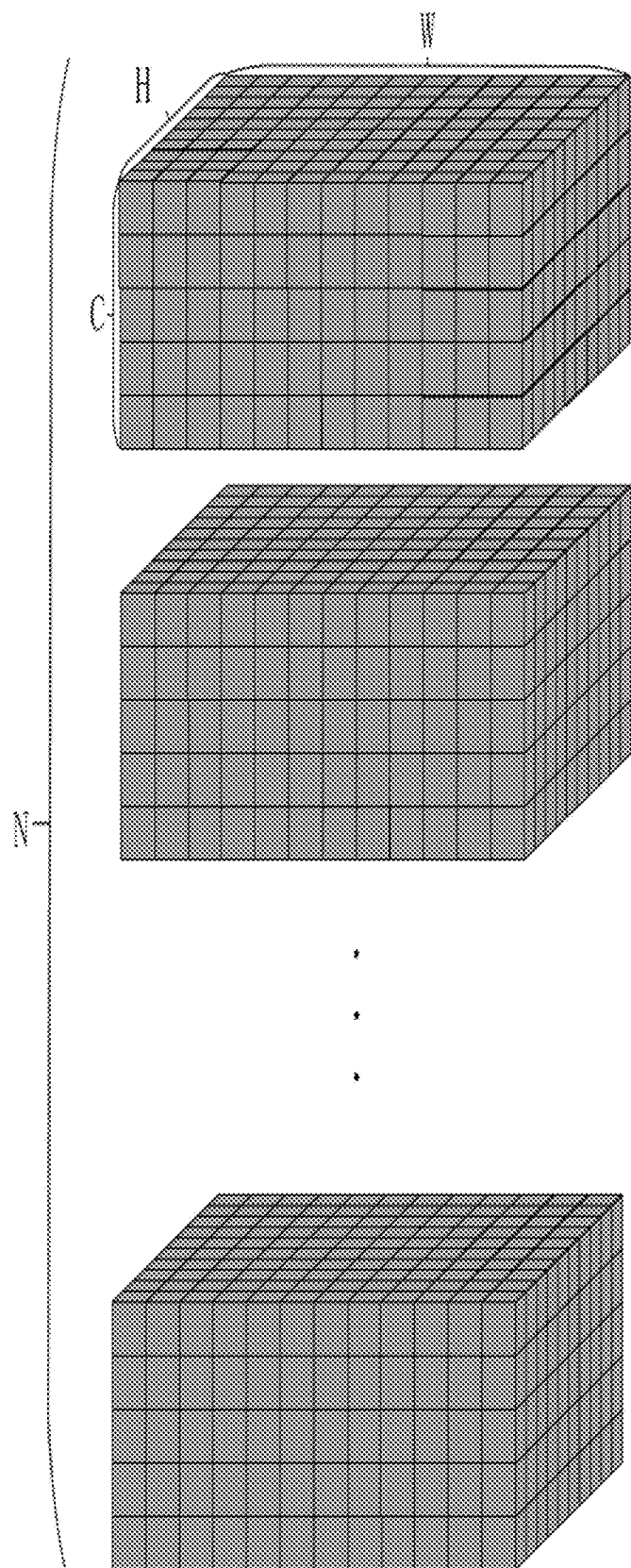
FIG. 8 is a schematic diagram of convolution input data.
Figure 9:
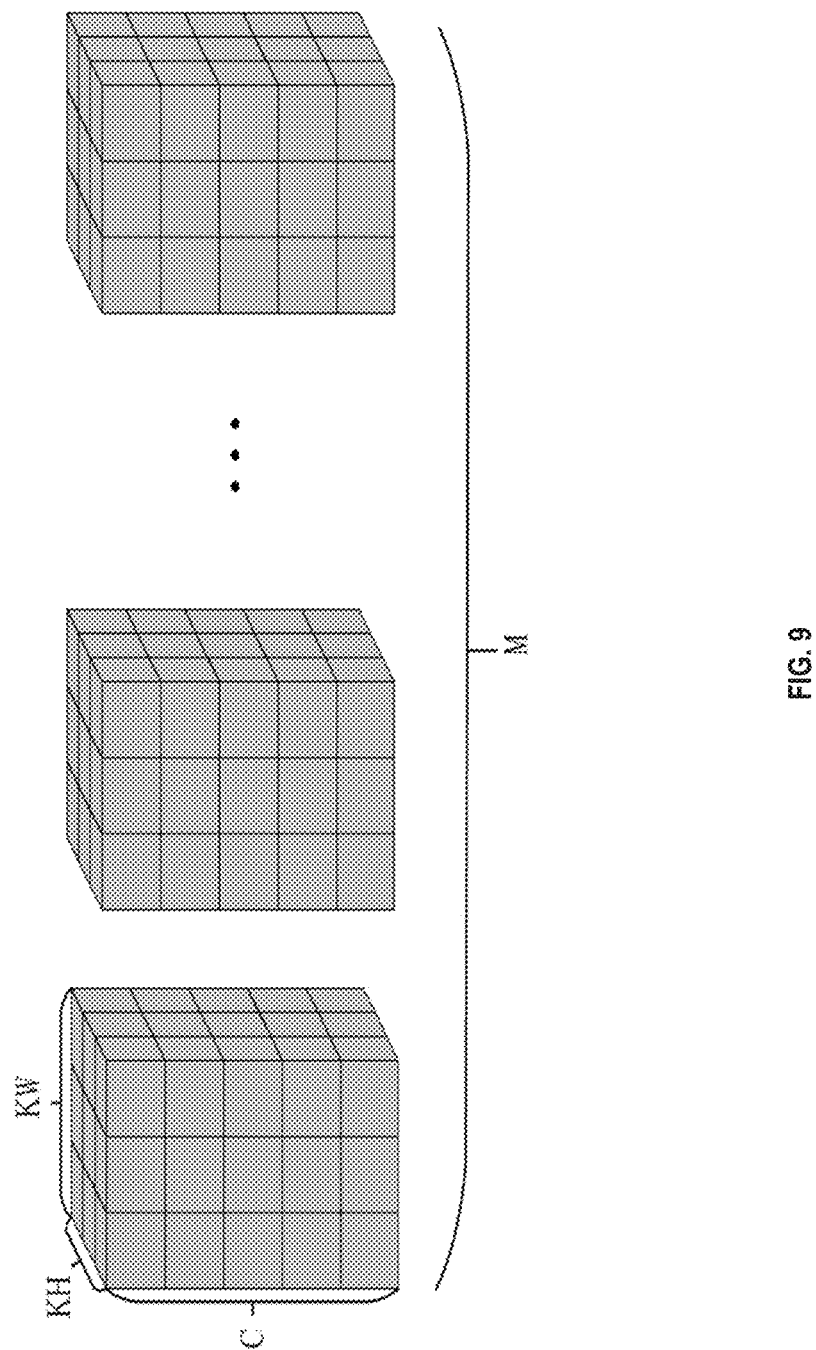
FIG. 9 is a schematic diagram of a convolution kernel.
Figure 10:
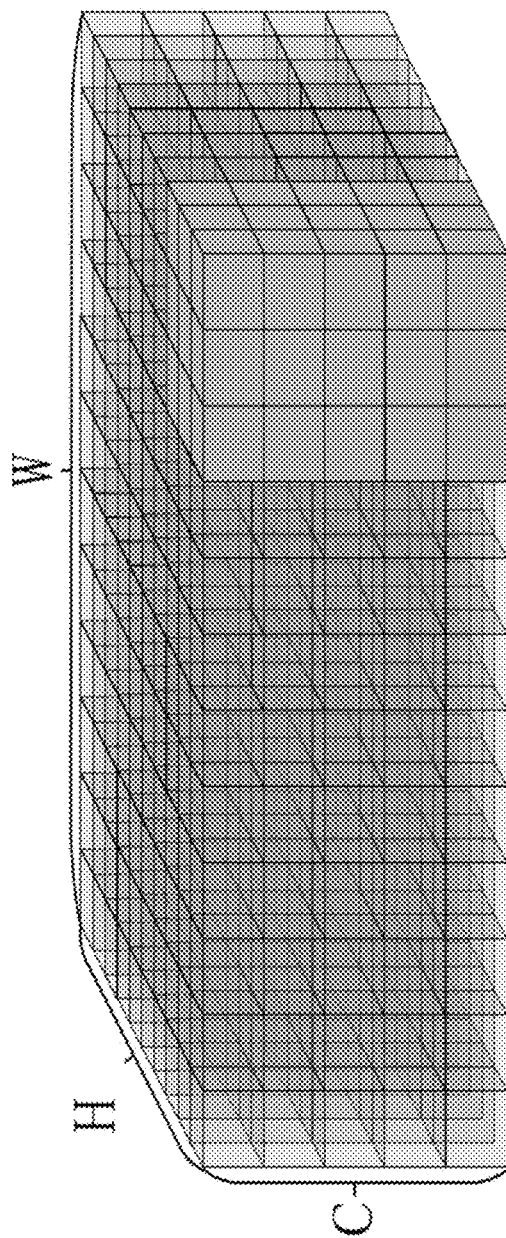
FIG. 10 is a schematic diagram of a computation window of a three-dimensional data block of input data.
Figure 11:
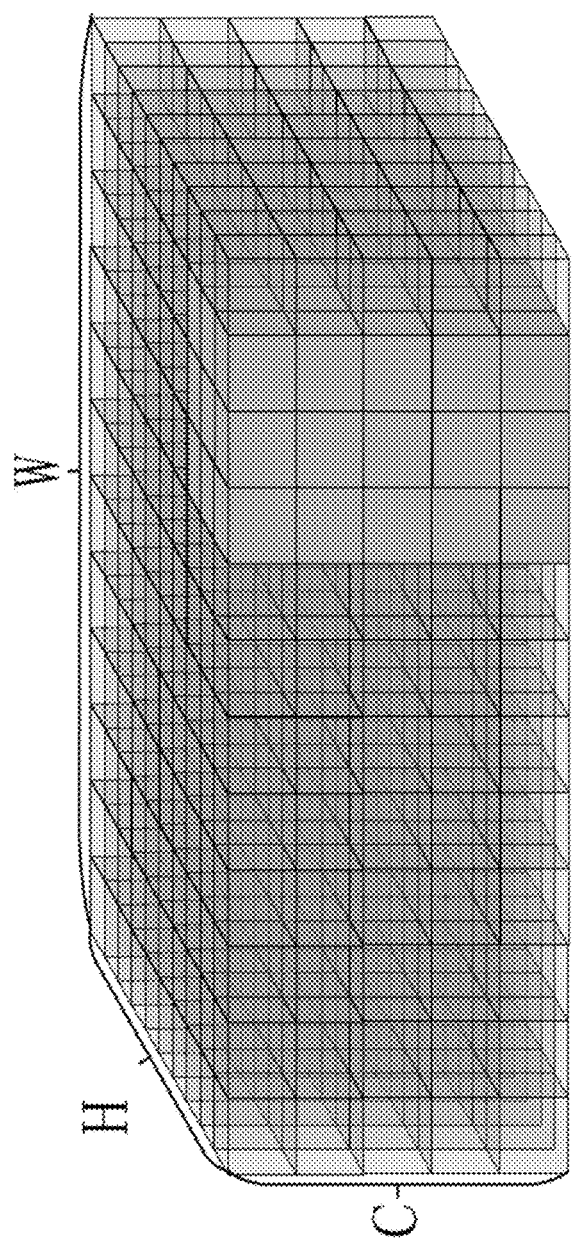
FIG. 11 is a schematic diagram of another computation window of a three-dimensional data block of input data.
Figure 12:
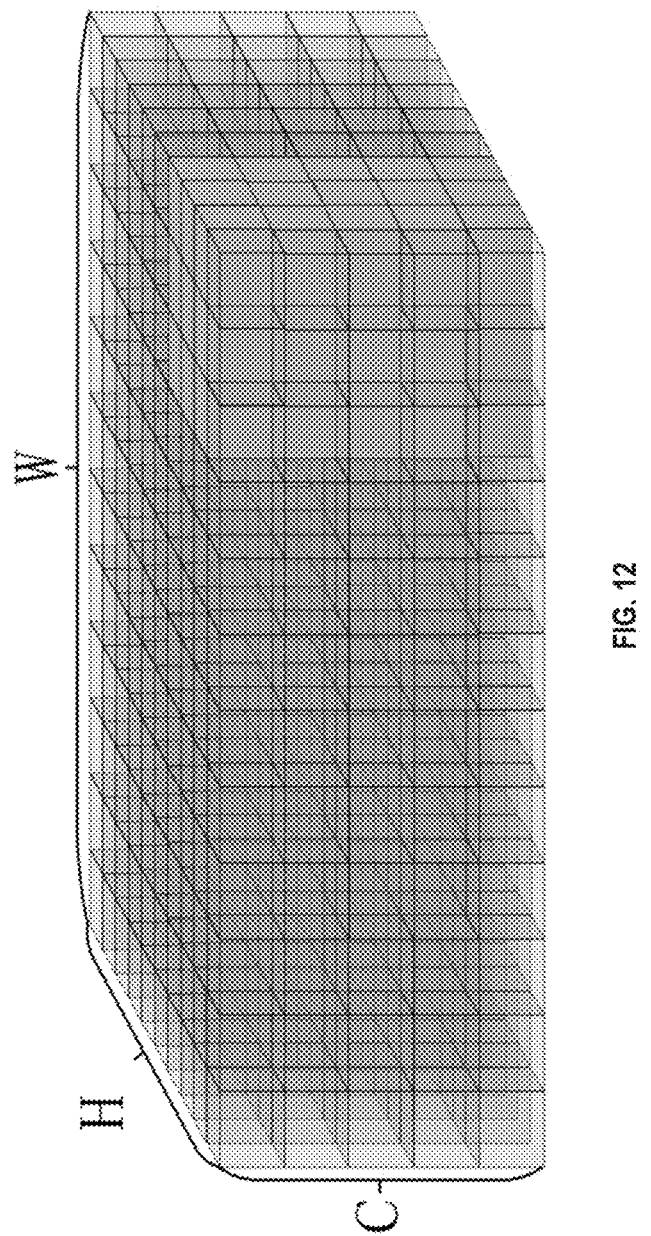
FIG. 12 is a schematic diagram of another computation window of a three-dimensional data block of input data.

Input data is shown in FIG. 8 (N samples, each sample has C channels, and a feature map of each channel has a height of H and a width of W). A weight, which is a convolution kernel, is shown in FIG. 9 (with M convolution kernels. Each convolution kernel has C channels with a height being KH and a width being KW). For the N samples of the input data, rules for convolution computations are the same. Below is an explanation of a process of performing a convolution computation on a sample. Each of the M convolution kernels is subject to the same computation. A plane feature map can be obtained from the computation of each convolution kernel. M plane feature maps can be obtained from the computations of M plane feature maps (for a sample, output of convolution is M feature maps). For a convolution kernel, inner product computations are to be performed on each plane of a sample. Then the convolution kernel slides in a direction of H and a direction of W. For instance, FIG. 10 shows an inner product computation of a convolution kernel at a position at lower right corner of a sample of input data. FIG. 11 shows the convolution kernel slides leftwards for one grid. FIG. 12 shows the convolution kernel slides upwards for one grid.

If a first computation is a convolution computation, the input data is convolution input data, and the weight data is a convolution kernel.

The first complexity is computed as: the first complexity=$\alpha * C1 * kW * kH * M * N * W * C2 * H$.

$\alpha$ is a convolution coefficient greater than 1. C1, kW, kH, M are values of four dimensions of the convolution kernel. N, W, C2, H are values of four dimensions of the convolution input data.

If the first complexity is greater than a preset threshold, it needs to be determined whether the convolution input data and the convolution kernel are floating point data. If the convolution input data and the convolution kernel are not floating point data, the convolution input data and the convolution kernel are converted into floating point data, and then the convolution input data and the convolution kernel are subject to a convolution computation of the floating point data type.

Specifically, the convolution may be processed by using the chip structure shown in FIG. 4. When the first complexity is greater than the preset threshold, the data type conversion circuit of the main processing circuit (or may be referred to as main unit) converts data in some or all convolution kernels of the weight to fixed point data. The control circuit of the main processing circuit transfers data of some or all convolution kernels of the weight to basic processing circuits (or may be referred to as basic unit) that are directly connected to the main processing circuit via horizontal data input interfaces.

In an alternative example, each time, the control circuit of the main processing circuit transfers a number or some numbers of data in a convolution kernel of the weight to a basic processing circuit. For instance, for a basic processing circuit, a $1^{st}$ number in a $3^{rd}$ row is transferred at a $1^{st}$ time, a $2^{nd}$ number in the $3^{rd}$ row is transferred at a $2^{nd}$ time, a $3^{rd}$ number in the $3^{rd}$ row is transferred at a $3^{rd}$ time, . . . , or first two numbers in a $3^{rd}$ row are transferred at a $1^{st}$ time, a $3^{rd}$ number and a $4^{th}$ number in the $3^{rd}$ row are transferred at a $2^{nd}$ time, a $5^{th}$ number and a $6^{th}$ number in the $3^{rd}$ row are transferred at a $3^{rd}$ time, . . . .

Another case in an alternative example may be that, each time, the control circuit of the main processing circuit transfers a number or some numbers of data of some convolution kernels of the weight to a basic processing circuit. For instance, for a basic processing circuit, $1^{st}$ numbers in a $3^{rd}$, $4^{th}$, and $5^{th}$ rows are transferred at a $1^{st}$ time, $2^{nd}$ numbers in the $3^{rd}$, $4^{th}$, and $5^{th}$ rows are transferred at a $2^{nd}$ time, $3^{rd}$ numbers in the $3^{rd}$, $4^{th}$, and $5^{th}$ rows are transferred at a $3^{rd}$ time, . . . , or first two numbers in the $3^{rd}$, $4^{th}$, and $5^{th}$ rows are transferred at a $1^{st}$ time, $3^{rd}$ numbers and $4^{th}$ numbers in the $3^{rd}$, $4^{th}$, and $5^{th}$ rows are transferred at a $2^{nd}$ time, $5^{th}$ numbers and $6^{th}$ numbers in the $3^{rd}$, $4^{th}$, and $5^{th}$ rows are transferred at a $3^{rd}$ time, . . . .

The control circuit of the main processing circuit classifies input data according to positions of convolution, and transfers data of some or all positions of convolution in the input data to the basic processing circuits that are directly connected to the main processing circuit via vertical data input interfaces.

In an alternative example, each time, the control circuit of the main processing circuit transfers a number or some numbers of data of a position of convolution in the input data to a basic processing circuit. For instance, for a basic processing circuit, a $1^{st}$ number in a $3^{rd}$ column is transferred at a $1^{st}$ time, a $2^{nd}$ number in the $3^{rd}$ column is transferred at a $2^{nd}$ time, a $3^{rd}$ number in the $3^{rd}$ column is transferred at a $3^{rd}$ time, . . . , or first two numbers in the $3^{rd}$ column are transferred at a $1^{st}$ time, a $3^{rd}$ number and a $4^{th}$ number in the $3^{rd}$ column are transferred at a $2^{nd}$ time, a $5^{th}$ number and a $6^{th}$ number in the $3^{rd}$ column are transferred at a $3^{rd}$ time, . . . .

Another case in an alternative example may be that, each time, the control circuit of the main processing circuit transfers a number or some numbers of data of some positions of convolution in the input data to a basic processing circuit. For instance, for a basic processing circuit, $1^{st}$ numbers in a $3^{rd}$, $4^{th}$, and $5^{th}$ columns are transferred at a $1^{st}$ time, $2^{nd}$ numbers in the $3^{rd}$, $4^{th}$, and $5^{th}$ columns are transferred at a $2^{nd}$ time, $3^{rd}$ numbers in the $3^{rd}$, $4^{th}$, and $5^{th}$ columns are transferred at a $3^{rd}$ time, . . . , or first two numbers in the $3^{rd}$, $4^{th}$, and $5^{th}$ columns are transferred at a $1^{st}$ time, $3^{rd}$ numbers and $4^{th}$ numbers in the $3^{rd}$, $4^{th}$, and $5^{th}$ columns are transferred at a $2^{nd}$ time, $5^{th}$ numbers and $6^{th}$ numbers in the $3^{rd}$, $4^{th}$, and $5^{th}$ columns are transferred at a $3^{rd}$ time, . . . .

After receiving the data of the weight, the basic processing circuit transfers the data to a subsequent basic processing circuit that is connected to the basic processing circuit via a horizontal data output interface of the basic processing circuit. After receiving the input data, the basic processing circuit transfers the data to a subsequent basic processing circuit that is connected to the basic processing circuit via a vertical data output interface of the basic processing circuit.

Each basic processing circuit performs computations on received data.

In an alternative example, each time, the basic processing circuit performs multiplication of one group or a plurality of groups of two sets of data, then accumulates results in the register and/or on-chip cache.

In an alternative example, each time, the basic processing circuit computes an inner product of one group or a plurality of groups of two vectors, then accumulates results in the register and/or on-chip cache.

After the basic processing circuit obtains a result by computing, the basic processing circuit outputs the result through the data output interface.

In an alternative example, the computation result may be a final result or an intermediate result of an inner product computation.

Specifically, if the basic processing circuit has an output interface that is directly connected to the main processing circuit, the basic processing circuit outputs the result via the interface. If the basic processing circuit does not have such output interface, the basic processing circuit outputs the result towards a basic processing circuit that can output to the main processing circuit directly.

After the basic processing circuit receives a computation result from another basic processing circuit, the basic processing circuit transfers the data to yet another basic processing circuit that is connected to the basic processing circuit or to the main processing circuit.

The basic processing circuit outputs a result towards the main processing circuit (for instance, basic processing circuits at a bottom row can transfer results to the main processing circuit directly, and other basic processing circuits may transfer results downwards via vertical output interfaces).

The main processing circuit receives inner product computation results transferred by the respective basic processing circuits to obtain an output result.

FIG. 6 shows a matrix-multiply-matrix computation. If the first computation is a matrix-multiply-matrix computation, the input data is a first matrix in the matrix-multiply-matrix computation, and the weight data is a second matrix in the matrix-multiply-matrix computation.

The first complexity is computed as: the first complexity=$\beta*F*G*E*F1$. $\beta$ is a matrix coefficient greater than or equal to 1. F and G are row and column values of the first matrix. E and F1 are row and column values of the second matrix.

If the first complexity is greater than the preset threshold, it needs to be determined whether the first matrix and the second matrix are floating point data. If the first matrix and the second matrix are not floating point data, the first matrix and the second matrix are converted into floating point data. Then the first matrix and the second matrix are subject to a matrix-multiply-matrix computations of the floating point type.

Figure 20:
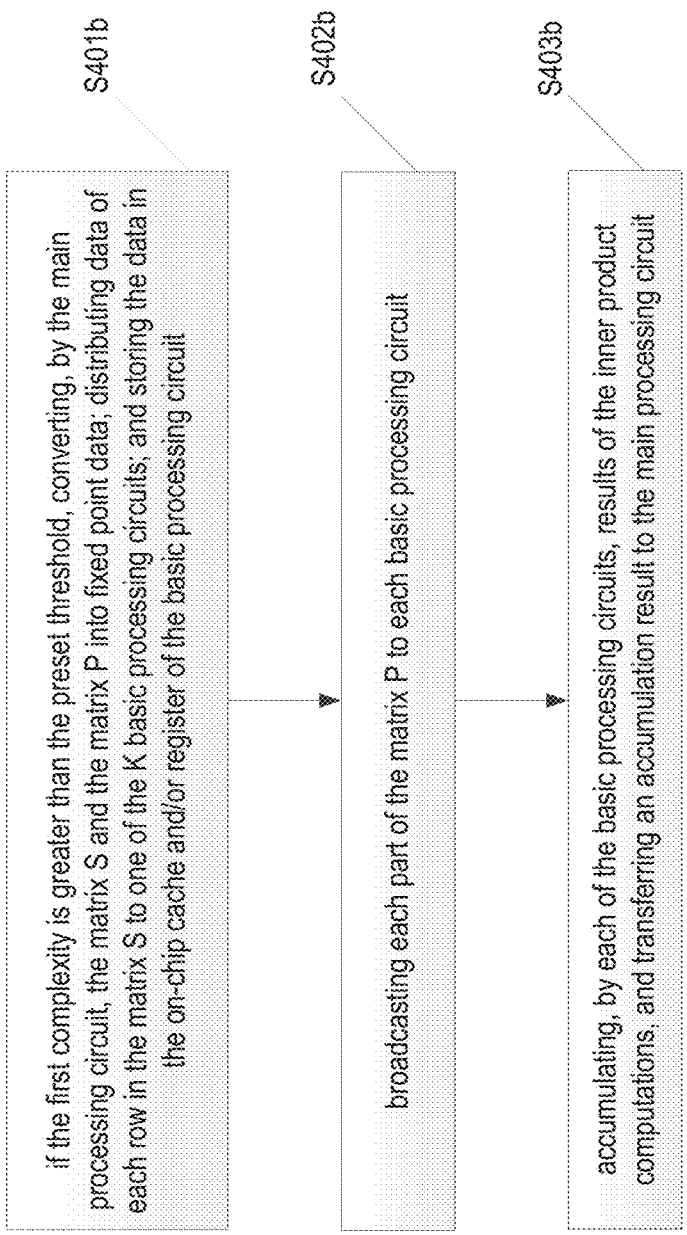
FIG. 20 is a flowchart of a method of a matrix-multiply-matrix computation.

FIG. 20 is a flowchart of using the device of FIG. 4 to perform a matrix-multiply-matrix computation.

Below is a description of performing multiplication of a matrix S with a size of M rows and L columns and a matrix P with a size of L rows and N columns (each row of the matrix S is as long as each column of the matrix P, which is as shown in FIG. 11). The neural network computing device has K basic processing circuits.

A method of the multiplication includes: S401b, if the first complexity is greater than the preset threshold, converting, by the main processing circuit, the matrix S and the matrix P into fixed point data; distributing, by the control circuit of the main processing circuit, data of each row in the matrix S to one of the K basic processing circuits; storing, by the basic processing circuit, the received data in the on-chip cache and/or the register; and specifically, the data may be transferred to basic processing circuits that are directly connected to the main processing circuit.

In an alternative example, M is the count of rows of the matrix S. If M<=K, the control circuit of the main processing circuit distributes a row of data of the matrix S to M basic processing circuits respectively.

As an alternative example, M is the count of rows of the matrix S, if M>K, the control circuit of the main processing circuit distributes data of one or a plurality of rows of the matrix S to each basic processing circuit respectively.

In a case where Mi rows of the matrix S are distributed to an $i^{th}$ basic processing circuit (a set of the Mi rows can be referred to as Ai), FIG. 12 shows a computation to be performed by the $i^{th}$ basic processing circuit.

As an alternative example, for each of the basic processing circuits, such as the $i^{th}$ basic processing circuit:

the matrix Ai distributed by the main processing circuit is received and stored in the register and/or on-chip cache of the $i^{th}$ basic processing circuit. Technical effects of the example include that data that is transferred later may be reduced, the computational efficiency may be improved, and the power consumption may be reduced.

The method includes S402b, broadcasting, by the control circuit of the main processing circuit, each part of the matrix P to each basic processing circuit.

As an alternative example, each part of the matrix P is broadcast for only once to the register or on-chip cache of each basic processing circuit. The $i^{th}$ basic processing circuit fully reuses data of the matrix P which is obtained at this time to complete an inner product computation corresponding to each row of the matrix Ai. The reusing mentioned in the example may be repeatedly using data by the basic processing circuits during computation. For instance, reusing data of the matrix P may be using the data of the matrix P for a plurality of times.

As an alternative example, the control circuit of the main processing circuit sequentially broadcasts each part of the matrix P to the register or on-chip cache of each basic processing circuit. The $i^{th}$ basic processing circuit does not reuse the data of the matrix P which is obtained at each time, and completes an inner product computation corresponding to each row of the matrix Ai at different times.

As an alternative example, the control circuit of the main processing circuit sequentially broadcasts each part of the matrix P to the register or on-chip cache of each basic processing circuit. The $i^{th}$ basic processing circuit partially reuses the data of the matrix P which is obtained at each time, and complete an inner product computation corresponding to each row of the matrix Ai.

In an alternative example, each of the basic processing circuits, such as the $i^{th}$ basic processing circuit, computes an inner product of the data of the matrix Ai and the data of the matrix P.

The method includes S403b, accumulating, by the accumulator circuit of each of the basic processing circuits, results of the inner product computations, and transferring an accumulation result to the main processing circuit.

As an alternative example, the basic processing circuits transfer a partial sum obtained from each inner product computation to the main processing circuit for accumulating.

In an alternative example, partial sums obtained from the inner product computations performed each time by the basic processing circuits may be stored in the on-chip caching circuits and/or the registers of the basic processing circuits, and transferred to the main processing circuit after the accumulation ends.

As an alternative example, partial sums obtained from the inner product computations performed each time by the basic processing circuits may also, in some cases, be stored in the on-chip caching circuits and/or the registers of the basic processing circuits for accumulating, and in some cases, be transferred to the main processing circuit for accumulating, then be transferred to the main processing circuit after the accumulation ends.

Figure 5:
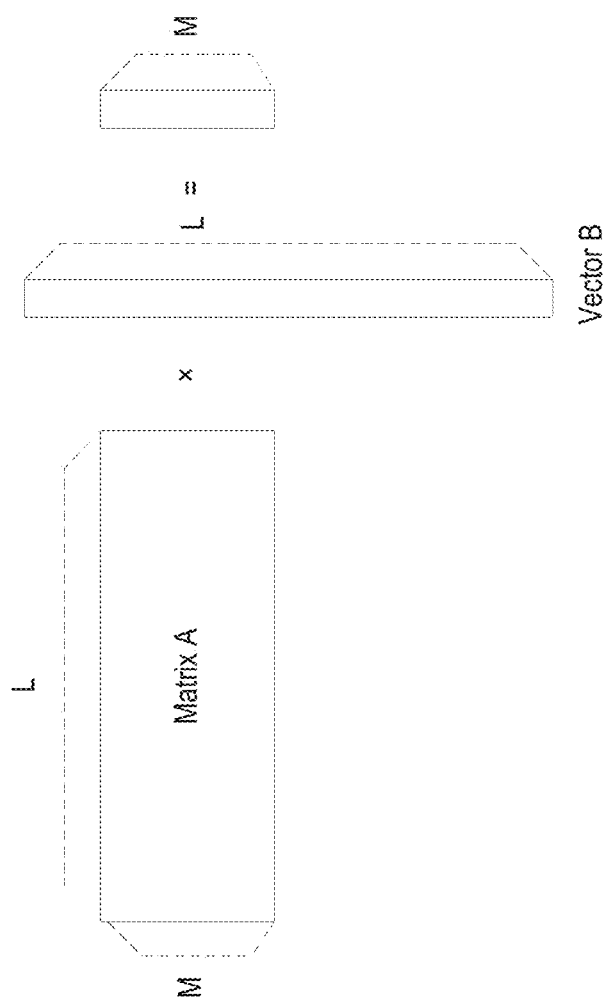
FIG. 5 is a schematic diagram showing a matrix-multiply-vector computation.

FIG. 5 is a schematic diagram of a matrix-multiply-vector computation. The first computation may be: a matrix-multiply-vector computation. The input data is a first matrix in the matrix-multiply-vector computation, and the weight data is a vector in the matrix-multiply-vector computation.

The first complexity=$\beta*F*G*F1$. $\beta$ is a matrix coefficient, $\beta$ is greater than or equal to 1, F and G are row and column values of the first matrix, and F1 is a column value of the vector.

If the first complexity is greater than the preset threshold, it needs to be determined whether the first matrix and the vector are floating point data. If the first matrix and the vector are not floating point data, the first matrix and the vector are converted into floating point data. Then the first matrix and the vector are subject to a matrix-multiply-vector computation according to the floating point data type.

Figure 21:
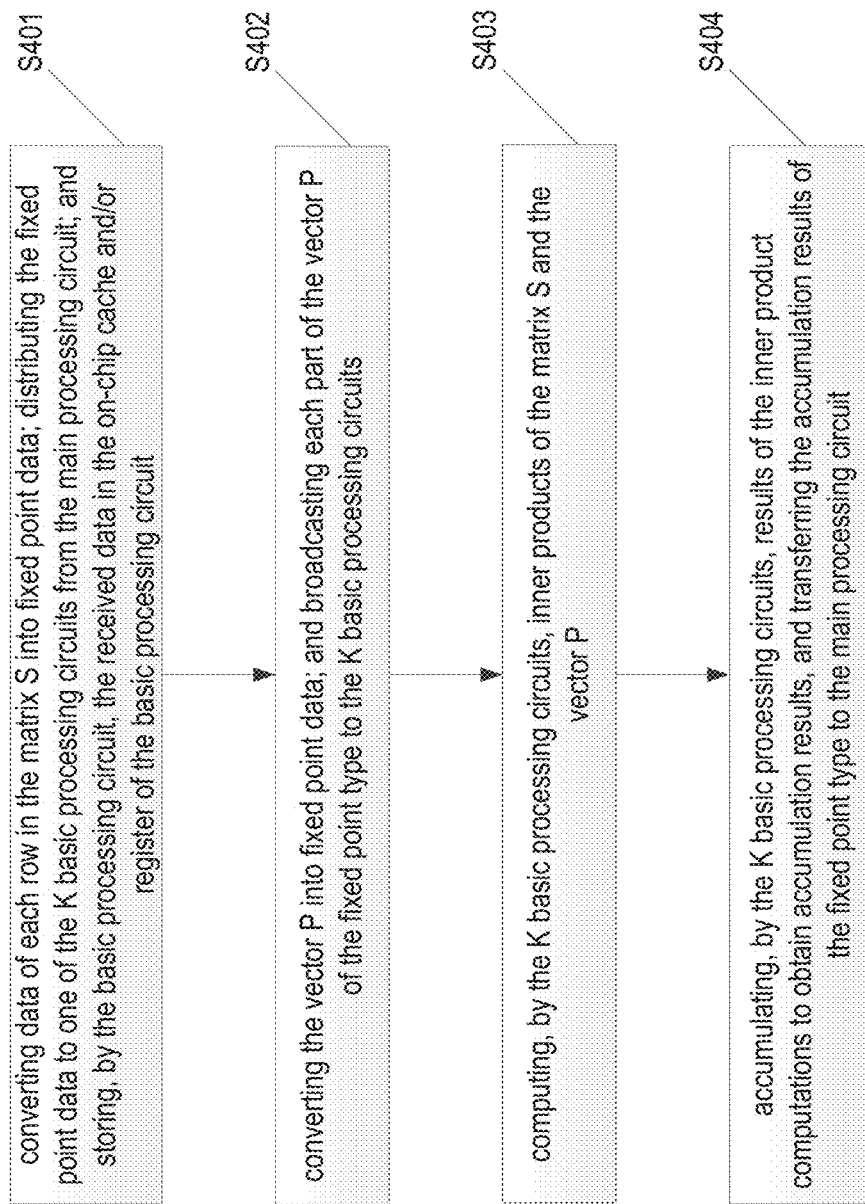
FIG. 21 is a flowchart of a method of a matrix-multiply-vector computation.

Referring to FIG. 21, an implementation method of a matrix-multiply-vector computation is provided, which may include:

S401, converting, by the data type conversion circuit of the main processing circuit, data of each row in the matrix S into fixed point data; distributing, by the control circuit of the main processing circuit, the fixed point data to one of the K basic processing circuits; and storing, by the basic processing circuit, the received data in the on-chip cache and/or the register of the basic processing circuit.

As an alternative example, M is the count of rows of the matrix S. If M<=K, the control circuit of the main processing circuit distributes a row of the matrix S to the K basic processing circuits respectively.

As an alternative example, M is the count of rows of the matrix S. If M>K, the control circuit of the main processing circuit distributes data of one or a plurality of rows of the matrix S to each basic processing circuit respectively.

A set of rows of the matrix S that are distributed to an $i^{th}$ basic processing circuit is referred to as Ai, which has Mi rows in total. FIG. 10 shows a computation to be performed by the $i^{th}$ basic processing circuit.

As an alternative example, for each basic processing circuit, such as the $i^{th}$ basic processing circuit, the received data such as a matrix Ai which is transferred by means of distributing may be stored in the register and/or on-chip cache. Technical effects of the example include that data that is transferred afterwards by means of distributing may be reduced, the computational efficiency may be improved, and the power consumption may be reduced.

The method includes S402, converting, by the data type conversion circuit of the main processing circuit, the vector P into fixed point data; and broadcasting, by the control circuit of the main processing circuit, each part of the vector P of the fixed point type to the K basic processing circuits.

As an alternative example, the control circuit of the main processing circuit may broadcast each part of the vector P for only once to the register or on-chip cache of each basic processing circuit. The $i^{th}$ basic processing circuit may fully reuse data of the vector P which is obtained at this time to complete an inner product computation corresponding to each row of the matrix Ai. Technical effects of the example include that the data of the vector P which are repeatedly transferred from the main processing circuit to the basic processing circuits may be reduced, the execution efficiency may be improved, and the power consumption for transfer may be reduced.

As an alternative example, the control circuit of the main processing circuit sequentially broadcasts each part of the vector P to the register or on-chip cache of each basic processing circuit. The $i^{th}$ basic processing circuit does not reuse data of the vector P which is obtained at each time, and completes an inner product computation corresponding to each row of the matrix Ai at different times. Technical effects of the example include that the data of the vector P which is transferred at a single time in the basic processing circuits may be reduced, the capacity of the cache and/or the register of the basic processing circuits may be reduced, the execution efficiency may be improved, the power consumption for transfer may be reduced, and the costs may be reduced.

As an alternative example, the control circuit of the main processing circuit sequentially broadcasts each part of the vector P to the register or on-chip cache of each basic processing circuit. The $i^{th}$ basic processing circuit partly reuses data of the vector P which is obtained at each time and completes an inner product computation corresponding to each row of the matrix Ai. Technical effects of the example include that the data transferred from the main processing circuit to the basic processing circuits may be reduced, the data that is transferred within the basic processing circuits may be reduced, the execution efficiency may be improved, and the power consumption for transfer may be reduced.

The method includes S403, computing, by the inner product computing unit circuits of the K basic processing circuits, inner products of the matrix S and the vector P; for instance, computing, by the $i^{th}$ basic processing circuit, an inner product of the data of matrix Ai and the data of the vector P; and S404, accumulating, by the accumulator circuits of the K basic processing circuits, results of the inner product computations to obtain accumulation results, and transferring the accumulation results of a fixed point type to the main processing circuit.

As an alternative example, a partial sum obtained from the inner product computation performed each time by a basic processing circuit may be transferred to the main processing circuit for accumulating (the partial sum refers to part of the accumulation result, for instance, if the accumulation result is F1*G1+F2*G2+F3*G3+F4*G4+F5*G5, the partial sum may be the value of F1*G1+F2*G2+F3*G3). Technical effects of the example include that computations performed within the basic processing circuits may be reduced, and the computational efficiency of the basic processing circuits may be improved.

In an alternative example, a partial sum obtained from the inner product computation performed each time by a basic processing circuit may be stored in the on-chip caching circuit and/or the register of the basic processing circuit, and transferred to the main processing circuit after the accumulation ends. Technical effects of the example include that data which are transferred between the basic processing circuit and the main processing circuit may be reduced, the computational efficiency may be improved, and the power consumption of data transfer may be reduced.

As an alternative example, a partial sum obtained from the inner product computation performed each time by a basic processing circuits may also, in some cases, be stored in the on-chip caching circuit and/or the register of the basic processing circuit for accumulating, and in some cases, be transferred to the main processing circuit for accumulating, then be transferred to the main processing circuit after the accumulation ends. Technical effects of the example include that data which are transferred between the basic processing circuit and the main processing circuits may be reduced, the computational efficiency may be improved, the power consumption of data transfer may be reduced, computations performed within the basic processing circuit may be reduced, and the computational efficiency of the basic processing circuit may be improved.

The present disclosure provides a neural network training method.

Data involved in the neural network training may be represented according to different methods.

The data representation methods include but are not limited to:

floating point numbers with different bit widths;

fixed point numbers with different bit widths; and fixed point numbers with different positions of fixed point.

Different times during a training process (different times of iterations or the time of initialization), different stages during the training process (forward or backward computation), different layers, different data blocks in the same layer (a plurality of input data blocks and output data blocks), or different sub-data blocks in the same data block may all:

be fixed point or floating point representation.

For the fixed point representation:

different fixed point bit widths may be used;

different fixed point bias values (fixed point positions) may be used.

Below is an example for explaining an implementation method of neural network training. FIG. 6 shows a computation of the neural network training of a single layer. Input data and a weight or a parameter are used for the computation of the layer. The technical solution of the example determines whether to convert the type of the input data and the weight according to the input data, the weight, and the amount of forward computations of the layer. A process of making the determination may be: if the register space or memory space for storing the input data and the weight is greater than a preset threshold, the amount of forward computations of the layer is greater than a preset amount of computations, and the input data and the weight are floating point data, it is determined that the input data and the weight are to be converted to fixed point data. If the register space or memory space for storing the input data and the weight is less than the preset threshold, and the input data and the weight are fixed point data, the computations of the layer are to be performed after the input data and the weight are converted to floating point data.

The principle of the data type conversion is explained below. FIG. 3 shows a representation of fixed point data. For a computing system, the storage bit of one set of floating point data is 32 bits. For fixed point data, particularly a data representation using the floating point data shown in FIG. 3, the storage bit of one set of fixed point data can be reduced to below 16 bits, which may greatly reduce transferring overhead between computing units during conversion. In addition, for a computing unit, the storage space of data having fewer bits may be smaller, which means that the storage overhead may be less, computations may also be reduced, and the computational overhead may be reduced. In this case, the fixed point data shown in FIG. 3 may reduce the computational overhead and storage overhead. However, data type conversion requires some computational overhead, which will be referred to as conversion overhead below. For data that requires a large amount of computations and storage, the conversion overhead is almost negligible compared with subsequent computational overhead, storage overhead, and transferring overhead. In this case, the present disclosure adopts a technical solution of converting data into fixed point data for data that requires a large amount of computations and a large amount of storage. On the contrary, for data that requires a small amount of computations and storage, the data requires less computational overhead, storage overhead, and transferring overhead. Since the precision of fixed point data is lower than the precision of floating point data, if fixed point data is used, under the premise that the amount of computations is relatively small, the fixed point data may be converted to floating point data so that the precision of computations can be guaranteed. In other words, the precision of computations may be improved by increasing a small amount of overhead.

Figure 22:
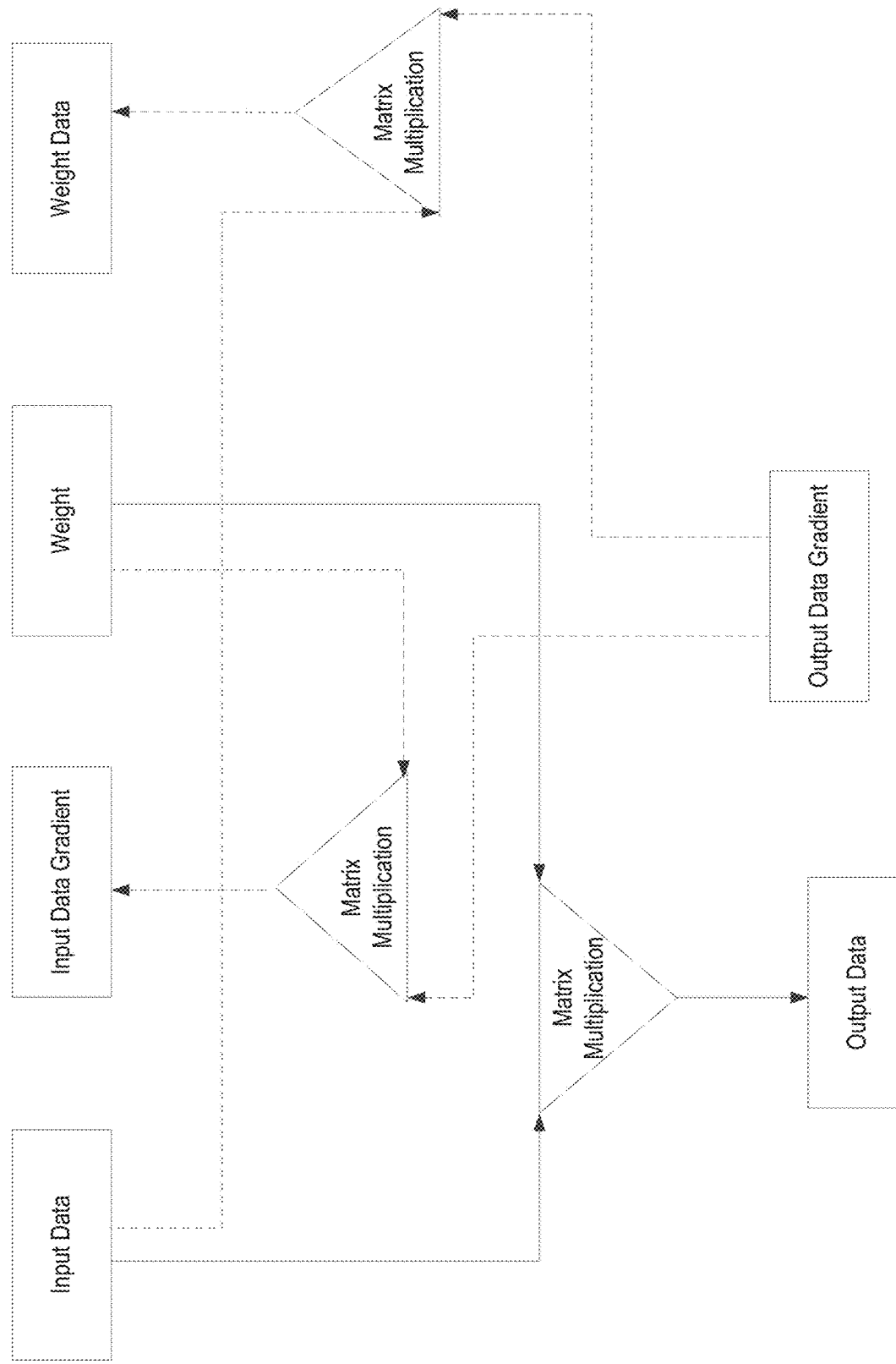
FIG. 22 is a schematic diagram of neural network training.

Below is an example. As show in FIG. 22, the computation of a present layer is a matrix multiplication. The input data and the weight of the layer are matrices. For ease of explanation, in the example, the input data is a matrix I, and the weight is a matrix W. As shown in FIG. 22, input data=matrix I*matrix W. If the sum of the columns of I and W as well the sum of the rows of I and W are relatively large, it can be considered that the matrix I and the matrix W occupy relatively large space of the memory and/or the register and have a relatively large amount of computations. In this case, if the matrix I and the matrix W are floating point data, the matrix I and the matrix W are first converted to fixed point data before being subject to the matrix multiplication.

For instance, the matrix I is a 1000*1000 matrix, and the matrix W is a 1000*1000 matrix. The sum of the columns and the sum of the rows are 2000, which are large and correspond to a large amount of computations. The matrix-multiply-matrix inner product computation includes 109 times of multiplication. In this technical solution, since the matrix I and the matrix W are large, it is impossible to transfer all the data at once. In this case, the same data may be transferred for several times. If data is transferred in fixed-point type, the amount of data transferred may be greatly reduced, which may thus reduce transferring overhead. The computations and storage of data with fewer bits may also reduce the computational overhead and storage overhead.

Figure 23:
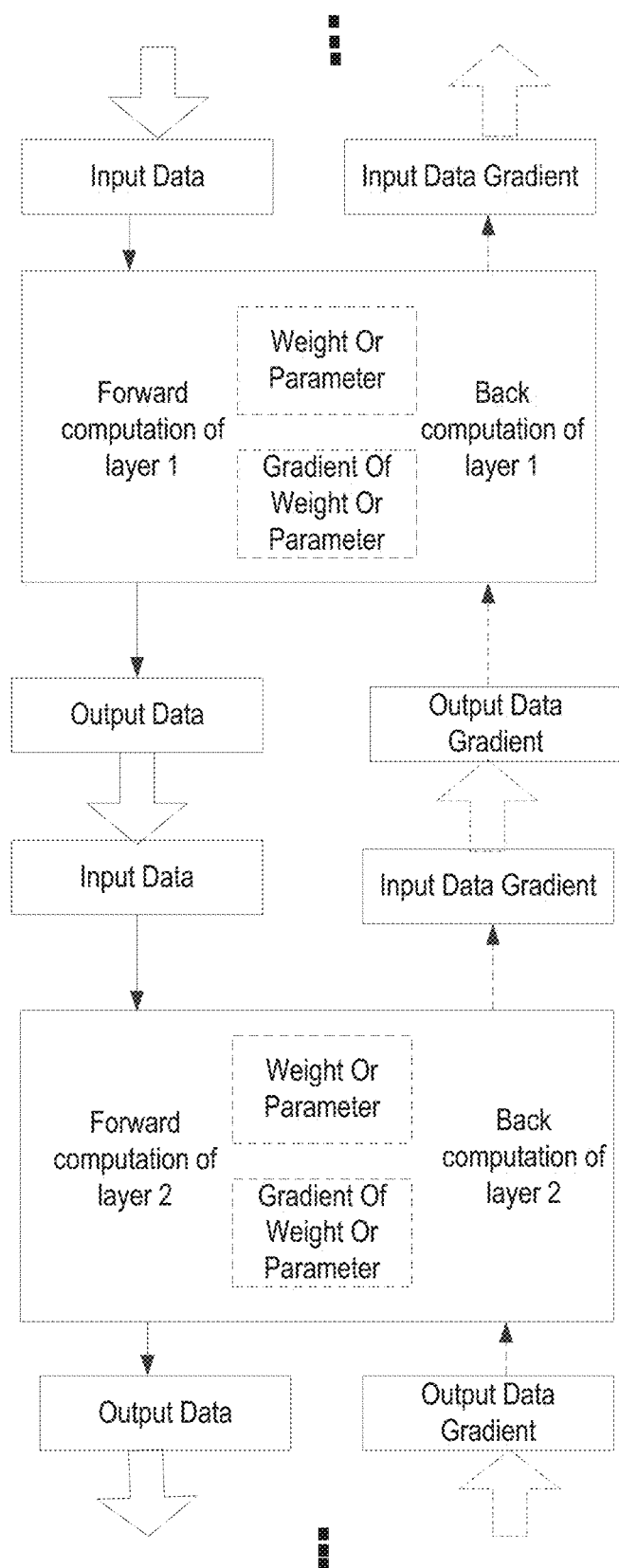
FIG. 23 is a schematic diagram of a forward computation and a backward computation of a neural network.

Regarding a technical solution of converting fixed point data to floating point data, taking a backward computation as an instance, a direction indicated by up arrows in a computational structure shown in FIG. 23 illustrates a backward computation. During a backward computation, it is an output data gradient that is computed. For a last layer of a present iteration computation, the output data gradient is obtained by performing a preset computation (which can be set by the manufacturer according to certain demands. The present disclosure does not restrict the steps of the preset computation) on output data of the last layer. For a layer except the last layer of the present iteration computation, such as an $i^{th}$ layer, the output data gradient is an input data gradient obtained from the backward computation of an $(i+1)^{th}$ layer.

Below is an example. As show in FIG. 23, the computation of a present layer is a matrix multiplication. The input data of the layer is a matrix and a weight of the layer is a scalar. For ease of explanation, in the example, the input data is a matrix I, and the weight is a scalar C. As shown in FIG. 23, output data=matrix I*scalar C. Since the weight is the data of the scalar, the amount of data computations is relatively small. In this case, if the matrix I is fixed point data, the matrix I is converted to floating point data before being subject to a matrix-multiply-scalar multiplication.

For instance, the matrix I is a 10*10 matrix, and the scalar is C. The sum of the columns and the sum of the rows are 20, which are relatively small (it is assumed that a sum greater than 100 is considered to be relatively large, and a sum less than 100 is considered to be relatively small. Besides 100, those skilled in the art may set another number). The corresponding amount of computations is relatively small. The matrix-multiply-matrix inner product computation includes 102 times of multiplication. Since the amount of computations is relatively small, if the computations are still performed on fixed point data, the precision may be affected. In this case, floating point data may be used in the computations to improve the precision under the premise of the small amount of computations.

In an alternative example, data blocks in network layers may have a fixed bit width. However, the position of the fixed point may change according to the iteration cycles of training.

Specifically, during a training process, a data representation method of a data block may be set as follows:

when the training starts, the data block may be represented randomly;

Alternatively or additionally, the data block may be represented as a floating point data block with a certain bit width;

Alternatively or additionally, the data block may be represented as a fixed point data block with a specific form of which the fixed point bit width may be specified or the fixed point position may be specified.

Alternatively or additionally, the fixed point position may be set according to a maximum value of absolute values of all data in the data block.

Alternatively or additionally, the fixed point position may be set according to a minimum value of the absolute values of all data in the data block.

In an alternative example, during initialization, the position of the fixed point of a data block may be determined according to the position of the fixed point of the of another data block.

Alternatively or additionally, the fixed point position of a data block may be set according to an empirical value.

Specifically, during a training process, the data representation method of a data block may be changed at any iteration cycle.

In an alternative example, the data representation of a data block may not be adjusted.

In an alternative example, the data representation may be adjusted every certain number of iterations.

In an alternative example, the data representation may be adjusted every certain number of training epochs.

In an alternative example, the data representation may be adjusted every unfixed number of iterations.

In an alternative example, the data representation may be adjusted every unfixed number of training epochs.

Specifically, during a training process, a representation method of a data block may be changed into any data representation method.

In an alternative example, if a data block is represented by a fixed point number with a fixed bit width, a method of adjusting the fixed point position of the data representation may be:

Alternatively or additionally, every time, setting the fixed point position according to a method of initializing the fixed point position; and Alternatively or additionally, when the fixed point position of a data block is obtained according to the method of initializing the fixed point position, if the fixed point position is increased in an iteration cycle compared with a previous iteration cycle, changing the fixed point position of the present iteration cycle towards the direction of increase, if the fixed point position is decreased in an iteration cycle compared with a previous iteration cycle, changing the fixed point position of the present iteration cycle towards the direction of decrease.

The present disclosure further provides an integrated circuit chip device for performing neural network training. The neural network includes a plurality of layers. The integrated circuit chip device includes a processing circuit and an external interface.

The external interface is configured to receive a training instruction.

The processing circuit is configured to determine input data of a first layer and weight data of the first layer according to the training instruction, and perform forward computations of n layers of the neural network according to the input data and the weight data of the first layer to obtain an $i^{th}$ output result.

The processing circuit is further configured to obtain an $i^{th}$ output result gradient according to the $i^{th}$ output result, obtain an $i^{th}$ backward computation of backward computations of an $i^{th}$ layer according to the training instruction, obtain an $i^{th}$ backward computation complexity according to the $i^{th}$ output result gradient, input data of the $i^{th}$ layer, weight group data of the $i^{th}$ layer, and the $i^{th}$ backward computation, determine an $i^{th}$ back data type of the $i^{th}$ output result gradient, the input data of the $i^{th}$ layer, and the weight group data of the $i^{th}$ layer according to the $i^{th}$ backward computation complexity, perform the backward computations of the $i^{th}$ layer of the neural network on the $i^{th}$ output result gradient, the input data of the $i^{th}$ layer, and the weight group data of the $i^{th}$ layer according to the $i^{th}$ back data type to obtain n weight gradients of the computations of the n layers, where the $i^{th}$ back data type includes: a fixed point type or a floating point type.

The processing circuit is further configured to update n weights of the computations of the n layers according to the n weight gradients.

Figure 7:
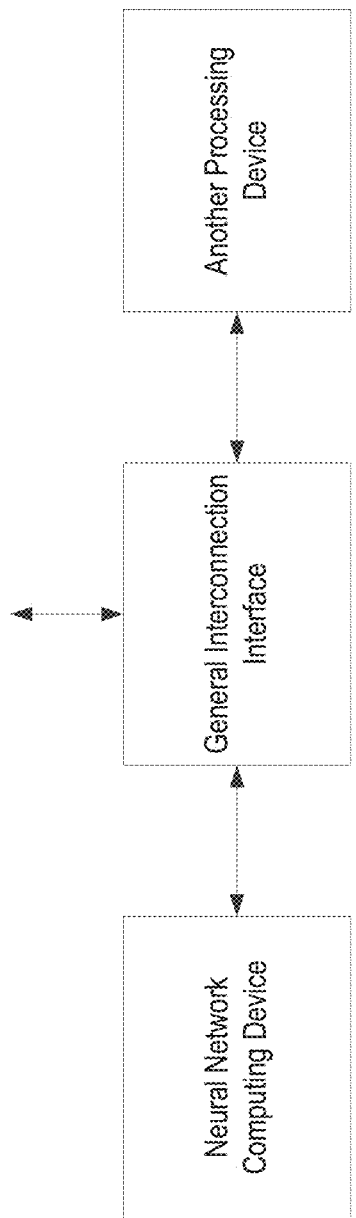
FIG. 7 is a structural diagram of a combined processing device according to the disclosure.

The present disclosure also provides a combined processing device which includes the above-mentioned neural network computing device, a general interconnection interface, and other processing devices (general-purpose processing devices). The neural network computing device interacts with other processing devices to perform operations specified by users. FIG. 7 is a schematic diagram of the combined processing device.

Other processing devices include one or more of a general-purpose/special-purpose processors such as a central processing unit (CPU), a graphics processing unit (GPU), a neural network processor, and the like. The present disclosure does not restrict a count of processors included in the other processing devices. Other processing devices may serve as interfaces that connect the neural network computing device to external data and control for data moving, and may perform the basic control such as starting and stopping the neural network computing device. Other processing devices may also cooperate with the neural network computing device to complete computation tasks.

The general interconnection interface is configured to transfer data and control instructions between the neural network computing device and other processing devices. The neural network computing device may obtain required input data from the other processing devices and write the data in an on-chip storage device of the neural network computing device. The neural network computing device may obtain control instructions from other processing devices, and write the control instructions in an on-chip control cache of the neural network computing device. The neural network computing device may further read data stored in a storage module of the neural network computing device and transfer the data to the other processing device.

Figure 13:
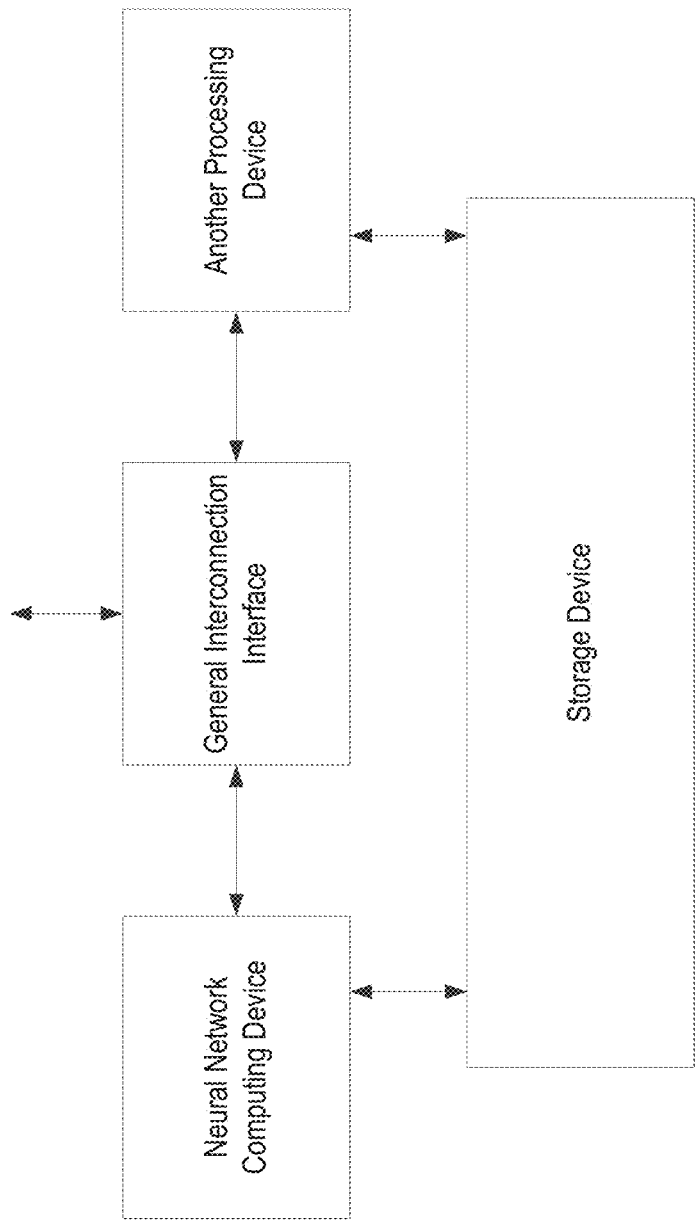
FIG. 13 is another structural diagram of a combined processing device according to the disclosure.

As shown in FIG. 13, Alternatively or additionally, the structure may further include a storage device configured to store required data of a present computing unit/computing apparatus or another computing unit, and is particularly suitable for a case where data that needs to be computed cannot be completely stored in an internal memory of the neural network computing device or another processing devices.

The combined processing device can be used as an SOC (System On Chip) of a device including a mobile phone, a robot, a drone, a video surveillance device, and the like, which may effectively reduce the core area of a control component, increase the processing speed, and reduce the overall power consumption. In this case, a universal interconnection interface of the combined processing device may be connected to some components of the device. The some components include webcams, monitors, mice, keyboards, network cards, and WIFI interfaces.

The present disclosure provides a neural network processor board card which can be used in various general-purpose or special-purpose computing system environments or configurations. For instance, personal computers, server computers, handheld or portable devices, tablet devices, smart home, home appliances, multiprocessor systems, microprocessor based systems, robots, programmable consumer electronics, network personal computers, small computers, large computers, distributed computing environments including any of the systems or devices above, and the like.

Figure 14:
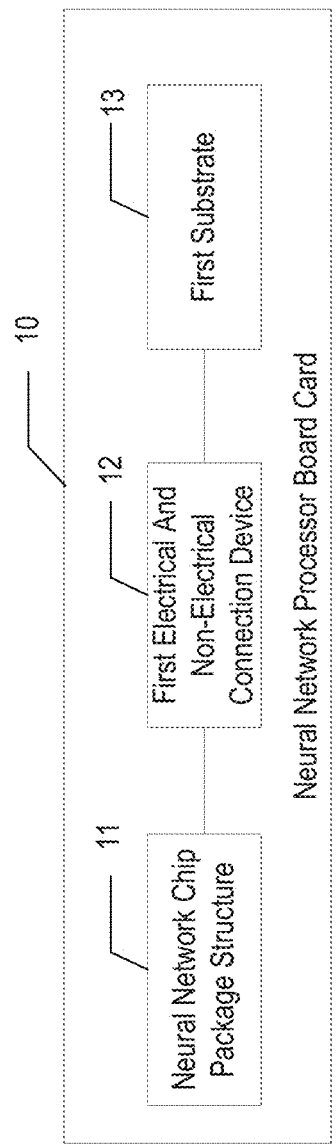
FIG. 14 is a structural diagram of a neural network processor board card according to an example of the present disclosure.
Figure 16:
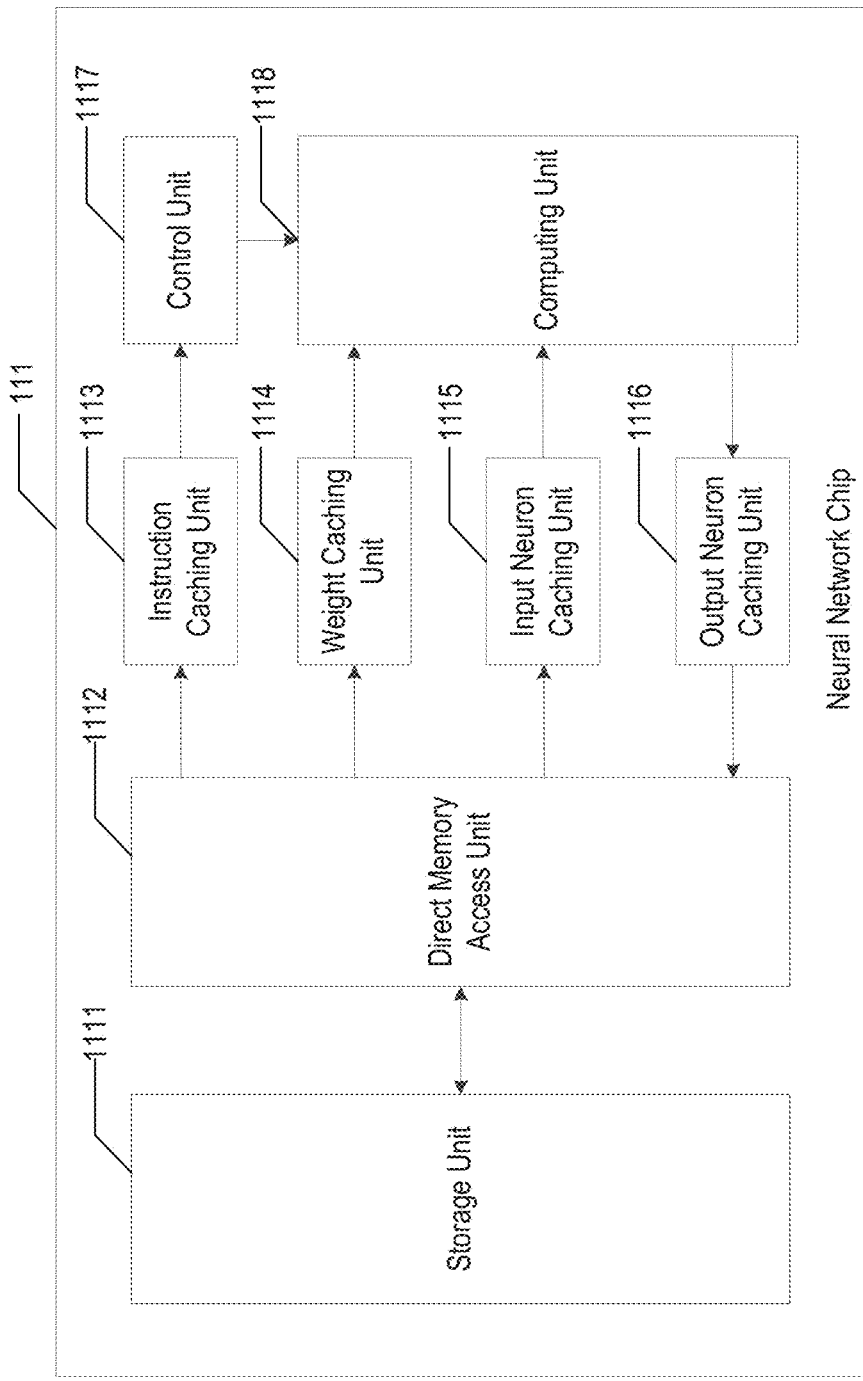
FIG. 16 is a structural diagram of a neural network chip according to an example of the present disclosure.

FIG. 14 is a structural diagram of a neural network processor board card according to an example of the present disclosure. As shown in FIG. 16, the neural network processor board card 10 includes a neural network chip package structure 11, a first electrical and non-electrical connection device 12, and a first substrate 13.

Figure 15:
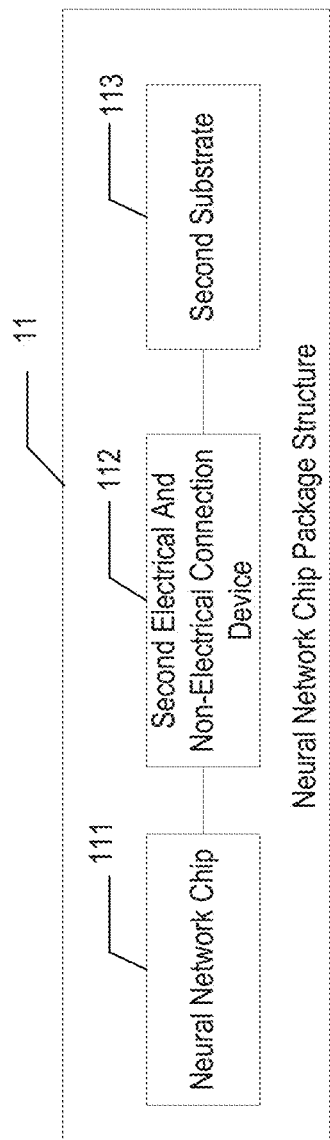
FIG. 15 is a structural diagram of a neural network chip package structure according to an example of the present disclosure.

The present disclosure does not restrict a specific structure of the neural network chip package structure 11. In some embodiments, as shown in FIG. 15, the neural network chip package structure 11 includes a neural network chip 111, a second electrical and non-electrical connection device 112, and a second substrate 113.

The present disclosure does not restrict a specific form of the neural network chip 111. The neural network chip 111 may include but is not limited to a neural network wafer integrated with a neural network processor, where the wafer may be made of silicon material, germanium material, quantum material, or molecular material. The neural network wafer may be packaged according to a real situation (for example, a harsh environment) and different application requirements, so that most of the neural network wafer may be wrapped, and leads on the neural network wafer may be connected to the outside of the packaging structure through conductors such as gold wire, which can be used for circuit connection with an outer layer.

Figure 1:
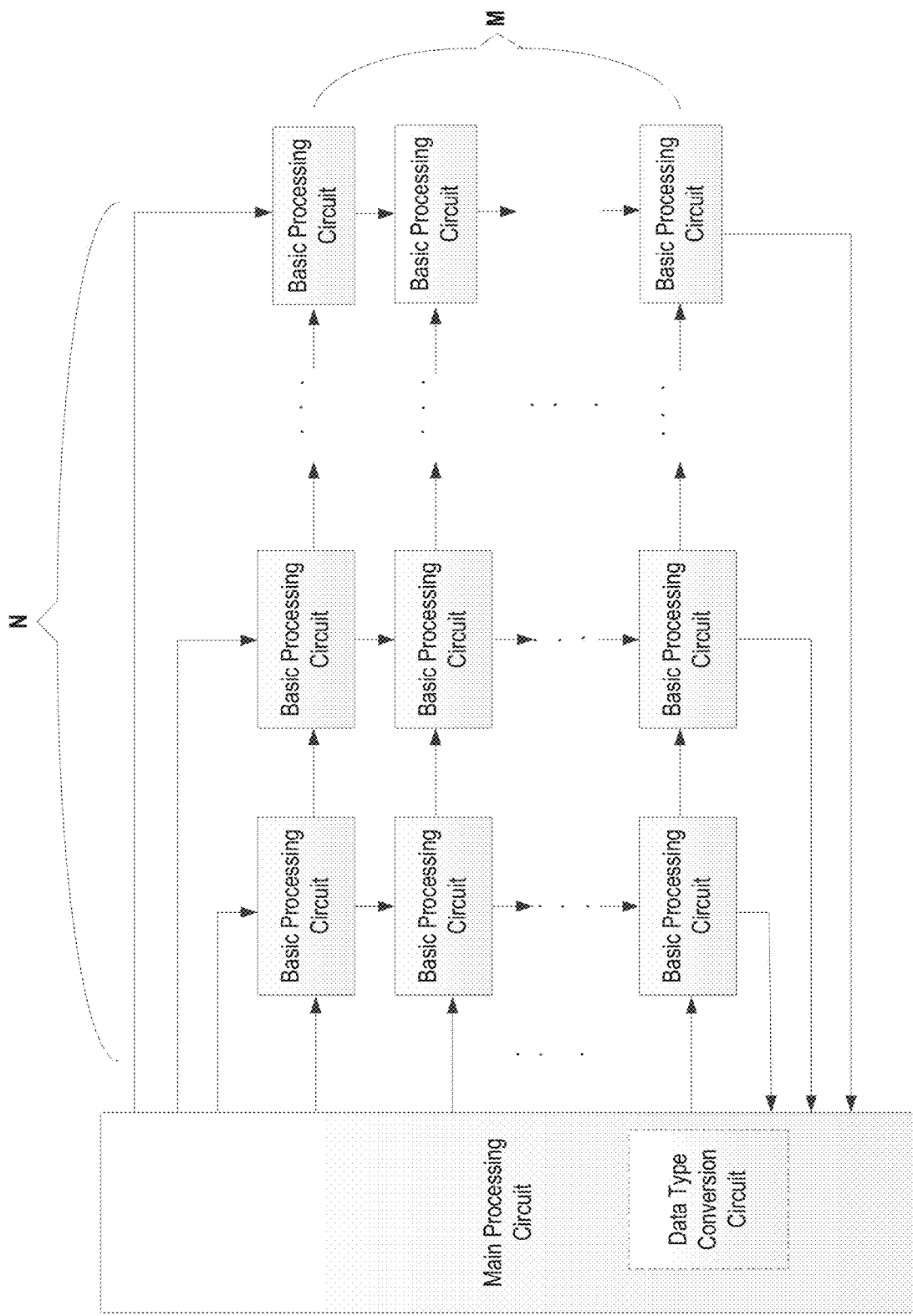
FIG. 1 is a structural diagram of an integrated circuit chip device.
Figure 2:
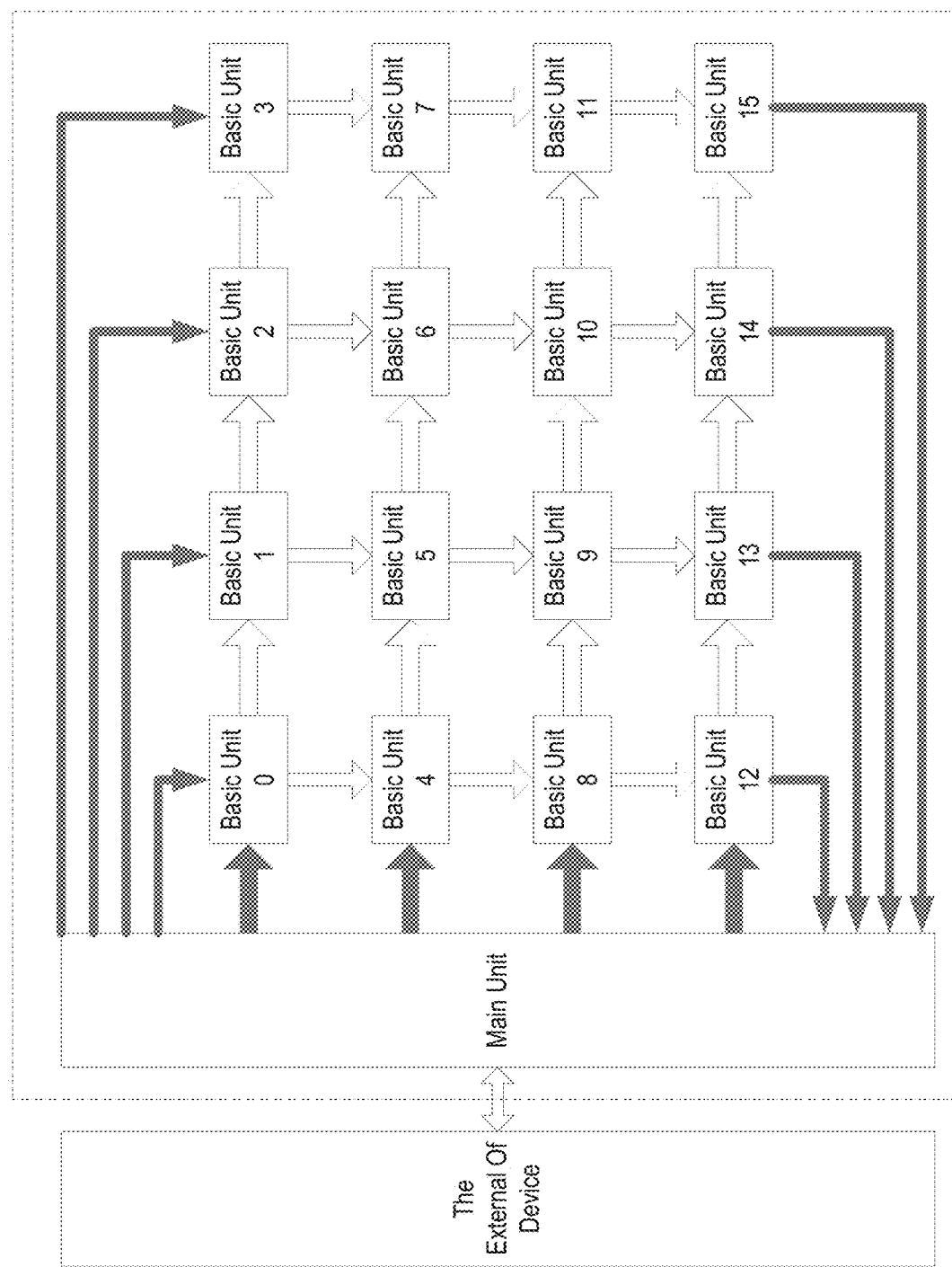
FIG. 2 is a structural diagram of other integrated circuit chip device.

The present disclosure does not restrict a specific structure of the neural network chip 111. Alternatively or additionally, the device shown in FIG. 1 and FIG. 2 may be used as reference.

The present disclosure does not restrict types of the first substrate 13 and the second substrate 113. The first substrate and the second substrate may be a printed circuit board (PCB) or a printed wiring board (PWB), and may also be another type of circuit board. The present disclosure does not restrict the material that the PCB is made of.

The second substrate 113 of the present disclosure may be used to bear the neural network chip 111, and the chip package structure obtained by connecting the neural network chip 111 and the second substrate 113 through the second electrical and non-electrical connection device 112 is used for protecting the neural network chip 111, so that the neural network chip package structure 11 and the first substrate 13 can be further packaged.

The present disclosure does not restrict a specific manner for packaging and a corresponding structure of the manner for packaging of the second electrical and non-electrical connection device 112. An appropriate package manner can be selected and be subject to simple improvement according to a certain situation and different application requirements, such as Flip Chip Ball Grid Array Package (FCBGAP), Low-profile Quad Flat Package (LQFP), Quad Flat Package with Heat Sink (HQFP), Quad Flat Non-lead Package (QFN), or a Fine-Pitch Ball Grid Package (FBGA) and other package manners.

A flip chip may be suitable for a case where the requirement on the area after packaging is high or an inductor of a conductive wire and a transmission time of a signal are sensitive. In addition, a package manner of wire bonding may be adopted to reduce the cost and increase the flexibility of the package structure.

Ball Grid Array may provide more leads, and the average wire length of the leads is short, which can transfer signals at high speed, where the package may be replaced by Pin Grid Array (PGA), Zero Insertion Force (ZIF), Single Edge Contact Connection (SECC), Land Grid Array (LGA), and the like.

Figure 17:
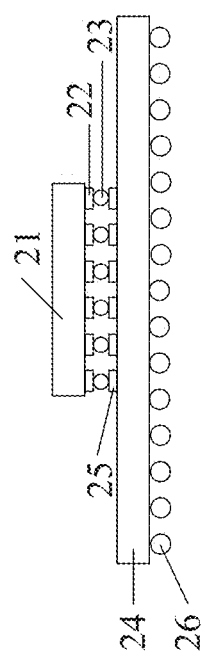
FIG. 17 is a schematic diagram of a neural network chip package structure according to an example of the present disclosure.

In some embodiments, the package manner of Flip Chip Ball Grid Array may be adopted to package the neural network chip 111 and the second substrate 113. Please refer to FIG. 17 for a schematic diagram of a package structure of the neural network chip. As shown in FIG. 17, the neural network chip package structure may include a neural network chip 21, a pad 22, a ball 23, a second substrate 24, a connection point 25 on the second substrate 24, and a lead 26.

The pad 22 is connected to the neural network chip 21, and the ball 23 is formed by welding between the pad 22 and the connection point 25 on the second substrate 24, in this way, the neural network chip 21 and the second substrate 24 is connected, thereby realizing the package of the neural network chip 21.

The lead 26 is used to connect an external circuit of the package structure (for instance, the first substrate 13 on the neural network processor board card 10) for transferring external data and internal data, which may facilitate data processing by the neural network chip 21 or a corresponding neural network processor of the neural network chip 21. A type and quantity of leads are not restricted in the present disclosure. Different lead types can be selected according to different packaging technologies, and leads can be arranged according to certain rules.

In some embodiments, the neural network chip package structure may further include an insulating filler disposed in the gap between the pad 22, the ball 23, and the connection point 25 for preventing interference between balls.

The material of the insulating filler may be silicon nitride, silicon oxide, or silicon oxynitride; and the interference may include electromagnetic interference, inductance interference, and the like.

In some embodiments, the neural network chip package structure may further include a heat dissipation device for dissipating heat generated during the operation of the neural network chip 21. The heat dissipation device may be a piece of metal with good thermal conductivity, a heat sink, or a radiator such as a fan.

Figure 18:
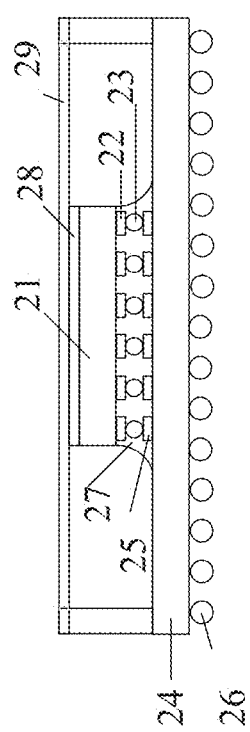
FIG. 18 is a schematic diagram of another neural network chip package structure according to an example of the present disclosure.

For instance, as shown in FIG. 18, the neural network chip package structure 11 may include: a neural network chip 21, a pad 22, a ball 23, a second substrate 24, a connection point 25 on the second substrate 24, a lead 26, an insulating filler 27, thermal compound 28, and a fin 29 with metal housing. Among them, the thermal compound 28 and the fin 29 with metal housing are configured to dissipate the heat generated during the operation of the neural network chip 21.

In some embodiments, the neural network chip package structure 11 may further include a reinforcing structure, which is connected to the pad 22, and is buried in the ball 23 to improve the connection strength between the ball 23 and the pad 22.

The reinforcing structure may be a metal wire structure or a columnar structure, which is not restricted herein.

A specific form of the first electrical and non-electrical device 12 is not restricted in the present disclosure. Please refer to the description of the second electrical and non-electrical device 112. In other words, the neural network chip package structure may be packaged by welding, or by connecting the second substrate 113 and the first substrate 13 through a connecting line or by means of plugging, so that the first substrate 13 or the neural network chip package structure 11 can be replaced conveniently later.

In some embodiments, the first substrate 13 may include a memory unit interface for expanding storage capacity, such as a Synchronous Dynamic Random Access Memory (SDRAM), and a Double Date Rate (DDR) SDRAM, and the like. By expanding the memory, the processing capacity of the neural network processor may be improved.

The first substrate 13 may further include a Peripheral Component Interconnect-Express (PCI-E or PCIe) interface, a Small Form-factor Pluggable (SFP) interface, and an Ethernet interface, a Controller Area Network (CAN) interface, and the like, which can be used for data transfer between the package structure and external circuits. In this way, the computational speed may be improved, and the operation may be easier.

The neural network processor is packaged into a neural network chip 111, the neural network chip 111 is packaged into a chip package structure 11, and the neural network chip package structure 11 is packaged into a neural network processor board card 10. Data interaction with an external circuit (for instance, a computer motherboard) may be performed through an interface (slot or ferrule) on the board card, that is, the function of the neural network processor may be implemented by using the neural network processor board card 10 directly, which may also protect the neural network chip 111. In addition, other modules may be added to the neural network processor board card 10, which may improve the application range and computational efficiency of the neural network processor.

An example of the present disclosure provides an electronic device including the neural network processor board card 10 or the neural network chip package structure 11.

The electronic device includes a data processing device, a robot, a computer, a printer, a scanner, a tablet, a smart terminal, a mobile phone, a traffic recorder, a navigator, a sensor, a webcam, a server, a camera, a video camera, a projector, a watch, a headphone, a mobile storage, a wearable device, a vehicle, a household appliance, and/or a medical equipment.

The vehicle includes an airplane, a ship, and/or a car. The household electrical appliance includes a television, an air conditioner, a microwave oven, a refrigerator, an electric rice cooker, a humidifier, a washing machine, an electric lamp, a gas cooker, and a range hood. The medical equipment includes a nuclear magnetic resonance spectrometer, a B-ultrasonic scanner, and/or an electrocardiograph.

The examples of the present disclosure have been described in detail above. The principles and implementation manners of the present disclosure have been described with the examples. The descriptions of the examples are only used for facilitating understanding of the methods and core ideas of the present disclosure. Persons of ordinary skill in the art may change the implementation and application scope according to the ideas of the present disclosure. In summary, the content of this specification should not be construed as a limitation on the present disclosure.

The invention claimed is:

1. An integrated circuit chip device for training a neural network having n layers, n being an integer greater than or equal to 2, wherein the integrated circuit chip device comprises:
a main processing circuit; and
a plurality of basic processing circuits;
wherein:
the main processing circuit comprises a data type conversion circuit configured to convert data between a floating point data type and a fixed point data type;
the integrated circuit chip device is configured to:
receive a training instruction;
determine input data and weight group data of a first layer according to the training instruction; and
perform a forward computation of an $i^{th}$ layer of the neural network on the input data and the weight group data of the first layer to obtain an $i^{th}$ output result of the forward computation, i being an integer greater than or equal to 1 and smaller than or equal to n;
the main processing circuit is further configured to:
obtain an $i^{th}$ output result gradient according to the $i^{th}$ output result;
obtain an $i^{th}$ backward computation of backward computations of the $i^{th}$ layer according to the training instruction;
obtain an $i^{th}$ backward computation complexity according to the $i^{th}$ output result gradient, input data of the $i^{th}$ layer, weight group data of the $i^{th}$ layer, and the $i^{th}$ backward computation;
determine an $i^{th}$ back data type corresponding to the $i^{th}$ output result gradient, the input data of the $i^{th}$ layer, and the weight group data of the $i^{th}$ layer according to the $i^{th}$ backward computation complexity; and
classify the $i^{th}$ output result gradient, the input data of the $i^{th}$ layer, and the weight group data of the $i^{th}$ layer into a broadcasting data block and a distribution data block according to a type of the $i^{th}$ backward computation;
at least one of the plurality of basic processing circuits is configured to:
perform computations on the broadcasting data block of the $i^{th}$ back data type and received basic data blocks of the $i^{th}$ back data type to obtain computation results; and
transfer the computation results to the main processing circuit;
the main processing circuit is further configured to:
process the computation results to obtain a weight group gradient of the $i^{th}$ layer and an input data gradient of the $i^{th}$ layer; and
update the weight group data of the $i^{th}$ layer according to the weight group gradient of the $i^{th}$ layer, wherein the $i^{th}$ back data type includes a fixed point type or a floating point type;
the integrated circuit device is further configured to:
perform backward computations of an $(i-1)^{th}$ layer using the input data gradient of the $i^{th}$ layer as an $(i-1)^{th}$ output result gradient of the $(i-1)^{th}$ layer to obtain a weight group gradient of the $(i-1)^{th}$ layer; and
update weight group data of a corresponding layer according to the weight group gradient of the $(i-1)^{th}$ layer, wherein the weight group data includes at least two weights; and the main processing circuit is further configured to:
when the $i^{th}$ backward computation is a multiplication computation, classify both the input data of the $i^{th}$ layer and the weight group data of the $i^{th}$ layer into distribution data blocks, and the $i^{th}$ output result gradient as a broadcasting data block; and
when the $i^{th}$ backward computation is a convolution computation, classify both the input data of the $i^{th}$ layer and the weight group data of the $i^{th}$ layer into broadcasting data blocks, and the $i^{th}$ output result gradient into a distribution data block.

2. The integrated circuit chip device of claim 1, wherein the main processing circuit is configured to:
compare the $i^{th}$ backward computation complexity with a preset threshold;
determine the $i^{th}$ back data type as the fixed point type when the $i^{th}$ backward computation complexity is greater than the preset threshold; and
determine the $i^{th}$ back data type as the floating point type when the $i^{th}$ backward computation complexity is less than or equal to the preset threshold.

3. The integrated circuit chip device of claim 2, wherein the main processing circuit is configured to:
determine whether the $i^{th}$ output result gradient, the input data of the $i^{th}$ layer, and the weight group data of the $i^{th}$ layer belong to an $(i+1)^{th}$ back data type; and
convert the $i^{th}$ output result gradient, the input data of the $i^{th}$ layer, and the weight group data of the $i^{th}$ layer belonging to the $(i+1)^{th}$ back data type to an $i^{th}$ output result gradient, input data of the $i^{th}$ layer, and weight group data of the $i^{th}$ layer belonging to the $i^{th}$ back data type, respectively, using the data type conversion circuit when the $(i+1)^{th}$ back data type differs from the $i^{th}$ back data type.

4. The integrated circuit chip device of claim 1, wherein:
the main processing circuit is configured to:
when the $i^{th}$ backward computation is a convolution computation, determine convolution input data as the input data of the $i^{th}$ layer and a convolution kernel as the $i^{th}$ output result gradient;
the $i^{th}$ backward computation complexity is computed as:
$i^{th}$ backward computation complexity=$\alpha*C1*kW*kH*M*N*W*C2*H$, wherein:
$\alpha$ is a convolution coefficient greater than 1;
C1, kW, kH, M are values of four dimensions of the convolution kernel; and
N, W, C2, and H are values of four dimensions of the convolution input data;
when the complexity is greater than a preset threshold, the main processing circuit is configured to:
determine the $i^{th}$ back data type as the floating point type; and
determine whether the convolution input data and the convolution kernel are floating point data; wherein:
when the convolution input data and the convolution kernel are not floating point data, the main processing circuit is configured to:
convert the convolution input data into floating point data and the convolution kernel into floating point data; and
perform the convolution computation on the convolution input data of the floating point type and the convolution kernel of the floating point type.

5. The integrated circuit chip device of claim 1, wherein:
the main processing circuit is configured to:
when the $i^{th}$ backward computation is a matrix-multiply-matrix computation, determine input data as the input data of the $i^{th}$ layer and a weight as the $i^{th}$ output result gradient;
the complexity is computed as complexity=$\beta*F*G*E*F1$, wherein:
$\beta$ is a matrix coefficient greater than or equal to 1;
F and G are row and column values of the input data of the $i^{th}$ layer; and
E and F1 are row and column values of the weight;
when the complexity is greater than a preset threshold, the main processing circuit is configured to:
determine the $i^{th}$ back data type as the floating point type; and
determine whether the input data and the weight of the $i^{th}$ layer are floating point data, wherein:
when the input data and the weight of the $i^{th}$ layer are not floating point data, the main processing circuit is configured to:
convert the input data of the $i^{th}$ layer into floating point data and the weight of the $i^{th}$ layer into floating point data; and
perform the matrix-multiply-matrix computation on the input data of the floating point type and the weight of the $i^{th}$ layer of the floating point type.

6. The integrated circuit chip device of claim 1, wherein:
the integrated circuit chip device is further configured to:
when the $i^{th}$ backward computation is a matrix-multiply-vector computation, determine input data as the input data of the $i^{th}$ layer and a weight as the $i^{th}$ output result gradient;
the complexity is computed as complexity=$\beta*F*G*F1$, wherein:
$\beta$ is a matrix coefficient greater than or equal to 1;
F and G are row and column values of the input data of the $i^{th}$ layer; and
F1 is a column value of the $i^{th}$ output result gradient;
when the complexity is greater than the preset threshold, the integrated circuit chip device is configured to:
determine the $i^{th}$ back data type as the floating point type; and
determine whether the input data and the weight of the $i^{th}$ layer are floating point data, wherein:
when the input data and the weight of the $i^{th}$ layer are not floating point data, the integrated circuit chip device is configured to:
convert the input data of the $i^{th}$ layer into floating point data and the weight of the $i^{th}$ layer into floating point data; and
perform the matrix-multiply-vector computation on the input data of the $i^{th}$ layer of the floating point type and the weight of the $i^{th}$ layer of the floating point type.

7. The integrated circuit chip device of claim 1, wherein:
the backward computations of the $i^{th}$ layer includes at least one of:
a bias operation, a fully connected operation, a GEMM operation, a GEMV operation, or an activation operation.

8. The integrated circuit chip device of claim 1, wherein:
the main processing circuit includes a main register or a main on-chip caching circuit; and
each basic processing circuit includes a basic register or a basic on-chip caching circuit.

9. The integrated circuit chip device of claim 8, wherein:
the main processing circuit includes at least one of:
a vector computing unit circuit, an arithmetic and logic unit circuit, an accumulator circuit, a matrix transposition circuit, a direct memory access circuit, or a data rearrangement circuit.

10. The integrated circuit chip device of claim 8, wherein:
the $i^{th}$ output result gradient includes at least one of:
a vector, a matrix, a three-dimensional data block, a four-dimensional data block, or an n-dimensional data block;
the input data of the $i^{th}$ layer includes at least one of:
a vector, a matrix, a three-dimensional data block, a four-dimensional data block, or an n-dimensional data block; and
the weight data of $i^{th}$ layer includes at least one of:
a vector, a matrix, a three-dimensional data block, a four-dimensional data block, or an n-dimensional data block.

11. A processing device, comprising:
a general interconnection interface;
a general processing device; and
a neural network computing device including at least one integrated circuit chip device for training a neural network having n layers, n being an integer greater than or equal to 2;
wherein:
the neural network computing device is connected to the general processing device through the general interconnection interface; and
the at least one integrated circuit chip device comprises:
a main processing circuit; and
a plurality of basic processing circuits;
wherein:
the main processing circuit comprises a data type conversion circuit configured to convert data between a floating point data type and a fixed point data type;
the integrated circuit chip device is configured to:
receive a training instruction;
determine input data and weight group data of a first layer according to the training instruction; and
perform a forward computation of an $i^{th}$ layer of the neural network on the input data and the weight group data of the first layer to obtain an $i^{th}$ output result of the forward computation, i being an integer greater than or equal to 1 and smaller than or equal to n;
the main processing circuit is further configured to:
obtain an $i^{th}$ output result gradient according to the $i^{th}$ output result;
obtain an $i^{th}$ backward computation of backward computations of the $i^{th}$ layer according to the training instruction;
obtain an $i^{th}$ backward computation complexity according to the $i^{th}$ output result gradient, input data of the $i^{th}$ layer, weight group data of the $i^{th}$ layer, and the $i^{th}$ backward computation;
determine an $i^{th}$ back data type corresponding to the $i^{th}$ output result gradient, the input data of the $i^{th}$ layer, and the weight group data of the $i^{th}$ layer according to the $i^{th}$ backward computation complexity; and classify the $i^{th}$ output result gradient, the input data of the $i^{th}$ layer, and the weight group data of the $i^{th}$ layer into a broadcasting data block and a distribution data block according to a type of the $i^{th}$ backward computation;
at least one of the plurality of basic processing circuits is configured to:
perform computations on the broadcasting data block of the $i^{th}$ back data type and received basic data blocks of the $i^{th}$ back data type to obtain computation results; and
transfer the computation results to the main processing circuit;
the main processing circuit is further configured to:
process the computation results to obtain a weight group gradient of the $i^{th}$ layer and an input data gradient of the $i^{th}$ layer; and
update the weight group data of the $i^{th}$ layer according to the weight group gradient of the $i^{th}$ layer, wherein the $i^{th}$ back data type includes a fixed point type or a floating point type;
the integrated circuit device is further configured to:
perform backward computations of an $(i-1)^{th}$ layer using the input data gradient of the $i^{th}$ layer as an $(i-1)^{th}$ output result gradient of the $(i-1)^{th}$ layer to obtain a weight group gradient of the $(i-1)^{th}$ layer; and
update weight group data of a corresponding layer according to the weight group gradient of the $(i-1)^{th}$ layer, wherein the weight group data includes at least two weights;
the main processing circuit is further configured to:
when the $i^{th}$ backward computation is a multiplication computation, classify both the input data of the $i^{th}$ layer and the weight group data of the $i^{th}$ layer into distribution data blocks, and the $i^{th}$ output result gradient as a broadcasting data block; and
when the $i^{th}$ backward computation is a convolution computation, classify both the input data of the $i^{th}$ layer and the weight group data of the $i^{th}$ layer into broadcasting data blocks, and the $i^{th}$ output result gradient into a distribution data block.

12. A method, implemented by an integrated circuit chip device comprising a plurality of basic processing circuits and a main processing circuit having a data type conversion circuit configured to convert data between a floating point data type and a fixed point data type, for training a neural network having n layers, n being an integer greater than or equal to 2, the method comprising:
receiving a training instruction;
determining input data and weight group data of a first layer according to the training instruction; and
performing a forward computation of an $i^{th}$ layer of the neural network on the input data and the weight group data of the first layer to obtain an $i^{th}$ output result of the forward computation, i being an integer greater than or equal to 1 and smaller than or equal to n;
obtaining, by the main processing circuit, an $i^{th}$ output result gradient according to the $i^{th}$ output result;
obtaining, by the main processing circuit, an $i^{th}$ backward computation of backward computations of the $i^{th}$ layer according to the training instruction;

obtaining, by the main processing circuit, an $i^{th}$ backward computation complexity according to the $i^{th}$ output result gradient, input data of the $i^{th}$ layer, weight group data of the $i^{th}$ layer, and the $i^{th}$ backward computation;

determining, by the main processing circuit, an $i^{th}$ back data type corresponding to the $i^{th}$ output result gradient, the input data of the $i^{th}$ layer, and the weight group data of the $i^{th}$ layer according to the $i^{th}$ backward computation complexity;

classifying, by the main processing circuit, the $i^{th}$ output result gradient, the input data of the $i^{th}$ layer, and the weight group data of the $i^{th}$ layer into a broadcasting data block and a distribution data block according to a type of the $i^{th}$ backward computation;

performing, by at least one of the plurality of basic processing circuits, computations on the broadcasting data block of the $i^{th}$ back data type and received basic data blocks of the $i^{th}$ back data type to obtain computation results;

transferring, by the at least one of the plurality of basic processing circuits, the computation results to the main processing circuit;

processing, by the main processing circuit, the computation results to obtain a weight group gradient of the $i^{th}$ layer and an input data gradient of the $i^{th}$ layer;

updating, by the main processing circuit, the weight group data of the $i^{th}$ layer according to the weight group gradient of the $i^{th}$ layer, wherein the $i^{th}$ back data type includes a fixed point type or a floating point type;

performing backward computations of an $(i-1)^{th}$ layer using the input data gradient of the $i^{th}$ layer as an $(i-1)^{th}$ output result gradient of the $(i-1)^{th}$ layer to obtain a weight group gradient of the $(i-1)^{th}$ layer;

updating weight group data of a corresponding layer according to the weight group gradient of the $(i-1)^{th}$ layer, wherein the weight group data includes at least two weights;

when the $i^{th}$ backward computation is a multiplication computation, classifying, by the main processing circuit, both the input data of the $i^{th}$ layer and the weight group data of the $i^{th}$ layer into distribution data blocks, and the $i^{th}$ output result gradient as a broadcasting data block; and when the $i^{th}$ backward computation is a convolution computation, classifying, by the main processing circuit, both the input data of the $i^{th}$ layer and the weight group data of the $i^{th}$ layer into broadcasting data blocks, and the $i^{th}$ output result gradient into a distribution data block.

13. The method of claim 12, further comprising:
comparing, by the main processing circuit, the $i^{th}$ backward computation complexity with a preset threshold;

determining, by the main processing circuit, the $i^{th}$ back data type as the fixed point type when the $i^{th}$ backward computation complexity is greater than the preset threshold; and determining, by the main processing circuit, the $i^{th}$ back data type as the floating point type when the $i^{th}$ backward computation complexity is less than or equal to the preset threshold.

14. The method of claim 13, further comprising:
determining, by the main processing circuit, whether the $i^{th}$ output result gradient, the input data of the $i^{th}$ layer, and the weight group data of the $i^{th}$ layer belong to an $(i+1)^{th}$ back data type; and converting, by the main processing circuit, the $i^{th}$ output result gradient, the input data of the $i^{th}$ layer, and the weight group data of the $i^{th}$ layer belonging to the $(i+1)^{th}$ back data type to an $i^{th}$ output result gradient, input data of the $i^{th}$ layer, and weight group data of the $i^{th}$ layer belonging to the $i^{th}$ back data type, respectively, using the data type conversion circuit when the $(i+1)^{th}$ back data type differs from the $i^{th}$ back data type.

15. The method of claim 12, further comprising:
when the $i^{th}$ backward computation is a convolution computation, determining, by the main processing circuit, convolution input data as the input data of the $i^{th}$ layer and a convolution kernel as the $i^{th}$ output result gradient;

wherein the $i^{th}$ backward computation complexity is computed as: $i^{th}$ backward computation complexity=$\alpha*C1*kW*kH*M*N*W*C2*H$, wherein:

$\alpha$ is a convolution coefficient greater than 1;

C1, kW, kH, M are values of four dimensions of the convolution kernel; and

N, W, C2, and H are values of four dimensions of the convolution input data;

when the complexity is greater than a preset threshold:
determining, by the main processing circuit, the $i^{th}$ back data type as the floating point type; and determining, main processing circuit, whether the convolution input data and the convolution kernel are floating point data, wherein:
when the convolution input data and the convolution kernel are not floating point data:
converting, by the main processing circuit, the convolution input data into floating point data and the convolution kernel into floating point data; and performing, by the main processing circuit, the convolution computation on the convolution input data of the floating point type and the convolution kernel of the floating point type.

16. The method of claim 12, further comprising:
when the $i^{th}$ backward computation is a matrix-multiply-matrix computation, determining, by the main processing circuit, input data as the input data of the $i^{th}$ layer and a weight as the $i^{th}$ output result gradient;

wherein the complexity is computed as complexity=$\beta*F*G*E*F1$, wherein:

$\beta$ is a matrix coefficient greater than or equal to 1;

F and G are row and column values of the input data of the $i^{th}$ layer; and

E and F1 are row and column values of the weight;

when the complexity is greater than a preset threshold:
determining, by the main processing circuit, the $i^{th}$ back data type as the floating point type; and determining, by the main processing circuit, whether the input data and the weight of the $i^{th}$ layer are floating point data, wherein:
when the input data and the weight of the $i^{th}$ layer are not floating point data:
converting, by the main processing circuit, the input data of the $i^{th}$ layer into floating point data and the weight of the $i^{th}$ layer into floating point data; and performing, by the main processing circuit, the matrix-multiply-matrix computation on the input data of the floating point type and the weight of the $i^{th}$ layer of the floating point type.

17. The method of claim 12, further comprising:
when the $i^{th}$ backward computation is a matrix-multiply-vector computation, determining input data as the input data of the $i^{th}$ layer and a weight as the $i^{th}$ output result gradient;
wherein the complexity is computed as complexity=$\beta*F*G*F1$, wherein:
$\beta$ is a matrix coefficient greater than or equal to;
F and G are row and column values of the input data of the $i^{th}$ layer; and
F1 is a column value of the $i^{th}$ output result gradient;
when the complexity is greater than the preset threshold:
determining the $i^{th}$ back data type as the floating point type; and
determining whether the input data and the weight of the $i^{th}$ layer are floating point data; wherein:
when the input data and the weight of the $i^{th}$ layer are not floating point data:
converting the input data of the $i^{th}$ layer into floating point data and the weight of the $i^{th}$ layer into floating point data; and
performing the matrix-multiply-vector computation on the input data of the $i^{th}$ layer of the floating point type and the weight of the $i^{th}$ layer of the floating point type.

18. The method of claim 12, wherein the backward computations of the $i^{th}$ layer includes at least one of:
a bias operation, a fully connected operation, a GEMM operation, a GEMV operation, or an activation operation.

19. The method of claim 12, wherein:
the main processing circuit includes a main register or a main on-chip caching circuit; and
each basic processing circuit includes a basic register or a basic on-chip caching circuit.

20. The method of claim 19, wherein:
the main processing circuit includes at least one of:
a vector computing unit circuit, an arithmetic and logic unit circuit, an accumulator circuit, a matrix transposition circuit, a direct memory access circuit, or a data rearrangement circuit.

* * * * *